(12) United States Patent
Furuchi

(10) Patent No.: US 9,197,148 B2
(45) Date of Patent: Nov. 24, 2015

(54) SEMICONDUCTOR DEVICE AND INVERTER SYSTEM

(71) Applicant: Renesas Electronics Corporation, Kawasaki-shi, Kanagawa (JP)

(72) Inventor: Masaki Furuchi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 51 days.

(21) Appl. No.: 14/242,444

(22) Filed: Apr. 1, 2014

(65) Prior Publication Data

US 2014/0312818 A1 Oct. 23, 2014

(30) Foreign Application Priority Data

Apr. 17, 2013 (JP) ................. 2013-086780

(51) Int. Cl.
*G05B 19/408* (2006.01)
*H02P 6/14* (2006.01)
(Continued)

(52) U.S. Cl.
CPC ............ *H02P 6/14* (2013.01); *H02M 7/53875* (2013.01); *H02P 6/085* (2013.01); *H02P 29/0038* (2013.01); *H02M 2001/0009* (2013.01)

(58) Field of Classification Search
USPC ........... 318/400.29, 772, 524, 773, 775, 776, 318/594, 602, 604, 678, 269, 270, 271, 375, 318/293, 400.13, 400.04, 568.22, 692, 681, 318/679, 619, 514, 400.17, 400.26, 801; 330/259, 261, 254, 257, 260, 282, 284, 330/285, 308, 51, 252, 214; 315/307, 205, 315/208, 287, 29; 257/595, E27.016, 257/E27.049, 197, 571, 578, 580, 582, 586, 257/592, E27.053, E29.026, E29.189, 428, 257/444, 72, E27.141; 396/263, 251, 265; 369/53.12, 44.11, 124.11, 53.37, 265; 327/513, 539, 540; 324/760.02, 500, 324/537, 548, 760.01, 177, 160; 363/132
See application file for complete search history.

(56) References Cited

U.S. PATENT DOCUMENTS 7,366,599 B2   4/2008   Norito
8,139,385 B2   3/2012   Furuchi
(Continued)

FOREIGN PATENT DOCUMENTS

EP   2 388 599 A2   11/2011
JP   2001-298337 A   10/2001
(Continued)

*Primary Examiner* — Kawing Chan
*Assistant Examiner* — Jorge L Carrasquillo
(74) *Attorney, Agent, or Firm* — Sughrue Mion, PLLC

(57) ABSTRACT

A semiconductor device includes first and second resistor groups, first and second switch groups, a register, and an amplifier. The first resistor group includes plural first resistors connected in series between a first terminal and an output of the amplifier. The first switch group includes plural first switches. Each of the first switches is connected between a corresponding one of the connection point between the first resistors and the inverting input terminal of the amplifier. The second resistor group includes plural second resistors connected in series between a second terminal of the amplifier and a reference voltage source. The second switch group includes plural second switches. Each of the second switches is connected between a corresponding one of the connection point between the second resistors and a positive input terminal of the amplifier. The register selects each of first and second switches.

15 Claims, 12 Drawing Sheets

(51) Int. Cl.
  *H02M 7/5387* (2007.01)
  *H02P 29/00* (2006.01)
  *H02P 6/08* (2006.01)
  *H02M 1/00* (2007.01)

(56) References Cited

U.S. PATENT DOCUMENTS

2002/0135764 A1* 9/2002 Oka et al. .................. 356/338
2009/0097287 A1* 4/2009 Furuchi ..................... 363/71

FOREIGN PATENT DOCUMENTS

| JP | 2004-210233 A | | 7/2004 |
| JP | 2005311742 A | * | 11/2005 |
| JP | 2009-095206 A | | 4/2009 |
| JP | 2009095206 A | * | 4/2009 |
| JP | 2011-254561 A | | 12/2011 |

* cited by examiner

SEMICONDUCTOR DEVICE AND INVERTER SYSTEM

CROSS-REFERENCE TO RELATED APPLICATIONS

The disclosure of Japanese Patent Application No. 2013-086780 filed on Apr. 17, 2013 including the specification, drawings and abstract is incorporated herein by reference in its entirety.

BACKGROUND

The present invention relates to a semiconductor device, for example, a semiconductor device incorporated into an inverter system.

An inverter control used for a motor control has been known. The inverter control is used for home appliances such as an air conditioner, a refrigerator, or a washing machine, or industrial machines. For example, Japanese Unexamined Patent Application Publication No. 2009-95206 (corresponding U.S. Pat. No. 8,139,385B2) discloses an inverter control circuit that conducts the inverter control. The inverter control circuit is configured to control the inverter circuit including a switch element. The inverter control circuit includes a timer circuit, an amplifier, and a gain control circuit. The timer circuit generates a PWM signal for controlling a conduction state of the switch element. The amplifier receives, amplifies, and outputs an analog signal generated by a load current of the inverter circuit. The gain control circuit controls switching of a gain of the amplifier in synchronization with an output change timing of the PWM signal.

As a related art, Japanese Unexamined Patent Application Publication No. 2004-210233 (corresponding U.S. Pat. No. 7,366,599B2) discloses an electric power steering device. The electric power steering device is configured to transmit a driving force of an electric motor to a steering mechanism to assist steering. The electric power steering device includes a current detector circuit, a microcomputer, and a gain changing unit. The current detector circuit is configured to detect a current flowing in the electric motor, and output a motor current detection signal. The current detector circuit outputs a motor current detection signal amplified by a variable gain amplifier circuit that can change the gain. The microcomputer has an analog/digital conversion port that receives the motor current detection signal output by the current detector circuit, and controls the electric motor on the basis of the motor current detection signal captured through the analog/digital conversion port. The gain changing unit changes the gain of the variable gain amplifier circuit. The variable gain amplifier circuit is configured such that a current flows into an analog switch SW. For that reason, an influence of an on-resistance of the analog switch SW causes an error to be generated in the gain of a differential amplifier.

Also, Japanese Unexamined Patent Application Publication No. 2001-298337 discloses a gain variable amplifier circuit. The gain variable amplifier circuit includes an operational amplifier, a gain switching resistor group, a plurality of analog switches, and a selector unit. The gain switching resistor group has a plurality of resistors connected in series with each other. The plurality of analog switches is connected between halfway points of the respective resistors in the gain switching resistor group, and an input terminal of the operational amplifier. The selector unit selectively turns on any one of all the analog switches. The gain variable amplifier circuit is configured such that no current flows into the analog switches. For that reason, the influence of the on-resistance of the analog switch SW does not cause an error to be generated in the gain of the operational amplifier, and the signal can be amplified with high precision. In this case, a common mode rejection ratio (CMRR) of the operational amplifier is degraded, and the common mode rejection ratio (CMRR) is changed by a change in the gain.

Also, Japanese Unexamined Patent Application Publication No. 2011-254561 (corresponding European Patent Publication No. EP2388599A2) discloses a motor current detection IC. The motor current detection IC includes a differential amplifier circuit, a pair of input terminals or a non-inverting input terminal and an inverting input terminal of the differential amplifier circuit, and an output terminal of the differential amplifier circuit. The input terminals of the differential amplifier circuit can receive a negative voltage. The input terminals of the differential amplifier circuit have a function of blocking a terminal to which an excessive voltage is input at the time of inputting the excessive voltage.

SUMMARY

In the inverter control disclosed in Japanese Unexamined Patent Application Publication No. 2009-95206, a shunt resistor is used for detecting a load current of the inverter circuit. A large current of about several dozen amperes flows in the shunt resistor, and a change in the value of current flowing in the shunt resistor is also large. For that reason, the inverter control circuit must operate under a noisy environment. Under that environment, for the purpose of controlling the motor with high precision to improve the efficiency, it is necessary that a voltage generated by a current flowing in the shunt resistor is amplified with high precision, and a signal from which the noise has been removed as much as possible is captured into a microcomputer. A technique that can amplify the signal with high precision while removing the noise as much as possible is desired.

The variable gain amplifier circuit in Japanese Unexamined Patent Application Publication No. 2004-210233 is configured such that a current flows in the analog switch SW. For that reason, the influence of the on-resistance of the analog switch SW causes the error to be generated in the gain of the differential amplifier. The gain variable amplifier circuit in Japanese Unexamined Patent Application Publication No. 2001-298337 is configured such that no current flows in the analog switch. For that reason, the influence of the on-resistance of the analog switch does not cause the error to be generated in the gain of the operational amplifier, and the signal can be amplified with high precision. However, in this case, because an impedance on an inverting input terminal side of the operational amplifier is varied, the common mode rejection ratio (CMRR) of the operational amplifier is degraded. Also, the common mode rejection ratio (CMRR) is varied with the fluctuation of the gain. The differential amplifier circuit in Japanese Unexamined Patent Application Publication No. 2011-254561 includes four resistors of resistors R1, R2, and variable resistors R4, R5 for determining the gain. Control is made so that the variable resistor R4 has the same resistance value as that of the variable resistor R5 to improve the common mode rejection ratio (CMRR). However, in the configuration of those variable resistors R4 and R5, an analog switch (not shown) is inserted into a path where a current flows. For that reason, the influence of the on-resistance of the analog switch causes the error to be generated in the gain of the differential amplifier.

The other problems and novel features will become apparent from a description of the present specification and the attached drawings.

According to one embodiment, a semiconductor device can arbitrarily set a gain switching resistor on an inverting input terminal side of an operational amplifier, and a resistor on an offset switching resistor on a non-inverting input terminal side, and substantially removes the analog switch used for switching the respective resistors from the current path of the operational amplifier.

According to the embodiment, the semiconductor device may amplify the signal with high precision while removing the noise as much as possible.

DETAILED DESCRIPTION

Hereinafter, a semiconductor device and an inverter according to embodiments will be described with reference to the accompanying drawings.

First Embodiment

Figure 1:
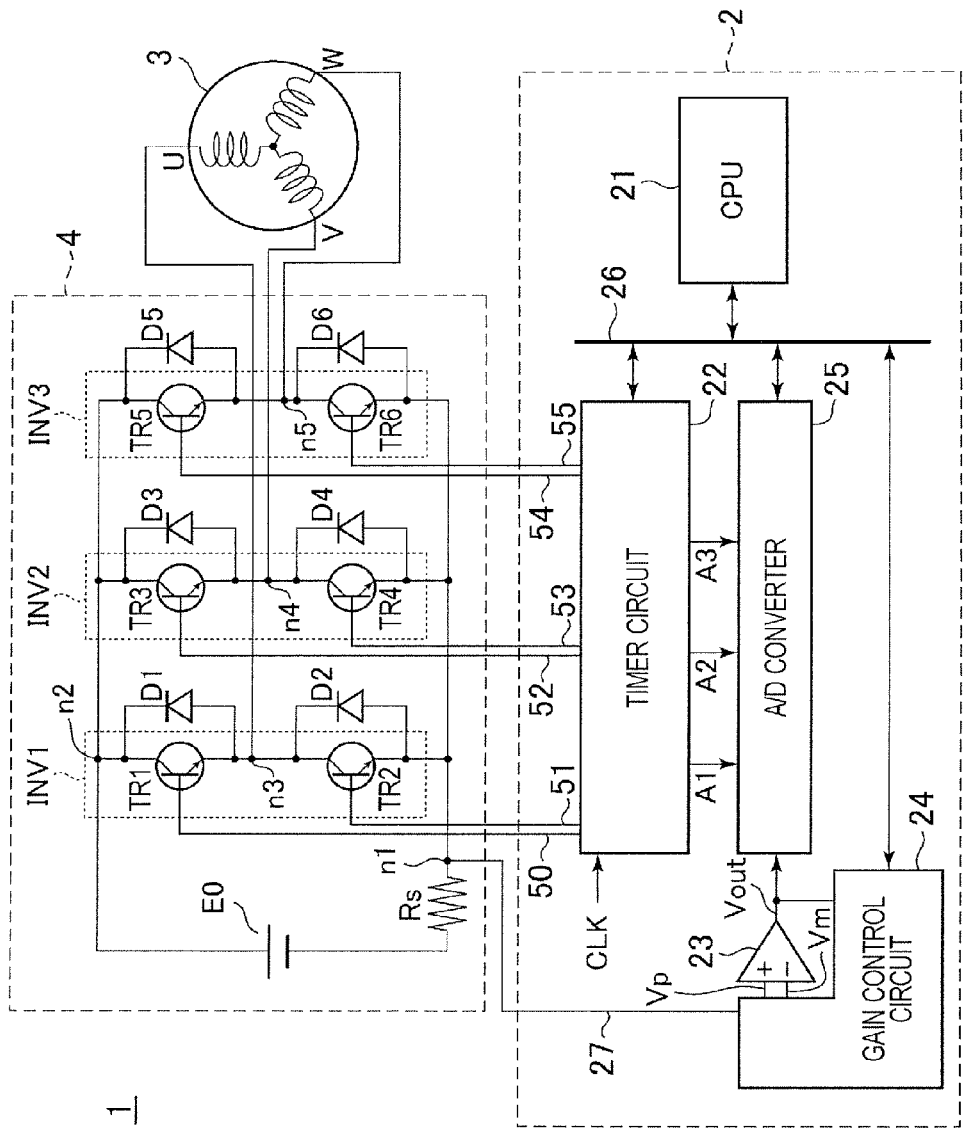
FIG. 1 is a block diagram illustrating a configuration example of a motor control system having an inverter system according to an embodiment.

Configurations of a semiconductor device and an inverter system according to a first embodiment will be described. FIG. 1 is a block diagram illustrating a configuration example of a motor control system having an inverter system according to a first embodiment. A motor control system 1 includes an inverter system (2, 4) and a motor 3. As will be described later, the inverter system (2, 4) supplies a controlled current to the motor 3. The motor 3 is a three-phase motor, and rotates according to the controlled current which is supplied from the inverter system (2, 4). In other words, a current that flows in the motor 3 is controlled by the inverter system (2, 4). In FIG. 1, only motor coils of the motor 3 are illustrated. Also, in the respective following embodiments, the number of phases in the motor 3, and the number of phases in the inverter system (2, 4) will be exemplified by three. However, the number of phases in the respective embodiments is not limited to this example.

The inverter system includes an inverter circuit 4 and a microcomputer 2. The inverter circuit 4 is connected to the motor 3, and supplies a current to the motor 3. The inverter circuit 4 includes a shunt resistor Rs. The shunt resistor Rs is disposed in a current path of the inverter circuit 4. The microcomputer 2 (semiconductor device) controls the supply of a current to the motor 3 in the inverter circuit 4 according to a drive signal (PWM signal) on the basis of a voltage (corresponding to the current supplied to the motor 3) across the shunt resistor Rs. In this situation, the microcomputer 2 is configured as described above, and therefore can amplify the voltage across the shunt resistor Rs with high precision while removing noise from the voltage as much as possible. As a result, the microcomputer 2 can control the supply of the current to the motor 3 with higher precision. FIG. 1 shows an example of one shunt in which one shunt resistor Rs is provided.

Hereinafter, the inverter system will be further described. The inverter circuit 4 further includes inverters INV1, INV2, INV3 for driving a three-phase motor, and a power supply E0. The power supply E0 is connected between a node n1 and a node n2. The inverters INV1, INV2, and INV3 are connected in parallel to the power supply E0.

The inverter INV1 includes switch elements TR1 and TR2. The switch elements TR1 and TR2 are driven by a PWM signal 50 of a U-phase, and a PWM signal 51 of a reverse phase of the U-phase, respectively. The switch element TR1 is an NPN transistor having a collector connected to the node n2, an emitter connected to a node n3, and a base receiving the PWM signal 50 of the U-phase. The switch element TR2 is an NPN transistor having a collector connected to the node n3, an emitter connected to the node n1, and a base receiving the PWM signal 51 of the reverse phase of the U-phase. The inverter INV1 further includes feedback diodes D1 and D2. The feedback diode D1 has an anode connected to the node n3, and a cathode connected to the node n2. The feedback diode D2 has an anode connected to the node n1, and a cathode connected to the node n3.

The inverter INV2 includes switch elements TR3 and TR4. The switch elements TR3 and TR4 are driven by a PWM signal 52 of a V-phase, and a PWM signal 53 of a reverse phase of the V-phase, respectively. The switch element TR3 is an NPN transistor having a collector connected to the node n2, an emitter connected to a node n4, and a base receiving the PWM signal 52 of the V-phase. The switch element TR4 is an NPN transistor having a collector connected to the node n4, an emitter connected to the node n1, and a base receiving the PWM signal 53 of the reverse phase of the V-phase. The inverter INV2 further includes feedback diodes D3 and D4. The feedback diode D3 has an anode connected to the node n4, and a cathode connected to the node n2. The feedback diode D4 has an anode connected to the node n1, and a cathode connected to the node n4.

The inverter INV3 includes switch elements TR5 and TR6. The switch elements TR5 and TR6 are driven by a PWM signal 54 of a W-phase, and a PWM signal 55 of a reverse phase of the W-phase, respectively. The switch element TR5 is an NPN transistor having a collector connected to the node n2, an emitter connected to a node n5, and a base receiving the PWM signal 54 of the W-phase. The switch element TR6 is an NPN transistor having a collector connected to the node n5, an emitter connected to the node n1, and a base receiving the PWM signal 55 of the reverse phase of the W-phase. The inverter INV3 further includes feedback diodes D5 and D6. The feedback diode D5 has an anode connected to the node n5, and a cathode connected to the node n2. The feedback diode D6 has an anode connected to the node n1, and a cathode connected to the node n5.

The nodes n3, n4, and n5, which are the respective inverter outputs, are connected to the three-phase coils configuring the motor 3, and supply currents to those coils. The currents supplied from the nodes n3, n4, and n5 flow into the motor 3 to control the rotation of the motor 3. The shunt resistor Rs is connected between the node n1 and the ground, and a voltage of the node n1 which is generated by allowing a load current across the inverter circuit 4 to flow through the shunt resistor Rs is applied to the microcomputer 2. The inverter circuit 4 turns on/off the switch elements TR1 to TR6 according to the PWM signals of six phases, which are input from the microcomputer 2, to adjust the currents to be supplied to the motor 3. The switch elements TR1 to TR6 are exemplified by the NPN transistors, but not limited to this example.

The microcomputer 2 (semiconductor device) includes a gain control circuit 24, an operational amplifier 23, an analog/digital converter (ADC) 25, a timer circuit 22, and a CPU 21. The gain control circuit 24, the ADC 25, the timer circuit 22, and the CPU 21 are connected to each other through a bus 26 in a two-way communication manner. The gain control circuit 24 amplifies a voltage (voltage of the node n1) 27 across the shunt resistor Rs in cooperation with the operational amplifier 23 to generate an output voltage Vout. A gain of the operational amplifier (amplifier) 23 is controlled by the gain control circuit 24. The ADC 25 subjects the output voltage Vout (analog value) to analog/digital conversion to generate an output signal (digital value). The CPU 21 conducts arithmetic operation for adjusting a pulse width of the PWM signal to generate a control signal. The timer circuit 22 generates a PWM signal (drive signal) for controlling a current output of the inverter circuit 4 on the basis of the control signal. The timer circuit 22 and the CPU 21 can be regarded as one control circuit.

The PWM signal controls on/off operation of the switch elements TR1 to TR6 in the inverters INV1 to INV3. The switch elements TR1 to TR6 adjusts a current which is supplied from the power supply E0 to the motor 3. The inverter circuit 4 outputs the voltage of the node n1 which is one end of the shunt resistor Rs to the microcomputer 2. The microcomputer 2 monitors the voltage of the node n1, and conducts feedback control for adjusting the pulse width of the PWM signal.

In this embodiment, all of the gain control circuit 24, the operational amplifier 23, the ADC 25, the timer circuit 22, and the CPU 21 are included in the microcomputer 2. However, this embodiment is not limited to this configuration, but a part or all of those components except for the CPU 21 may be disposed outside of the microcomputer 2.

Figure 2:
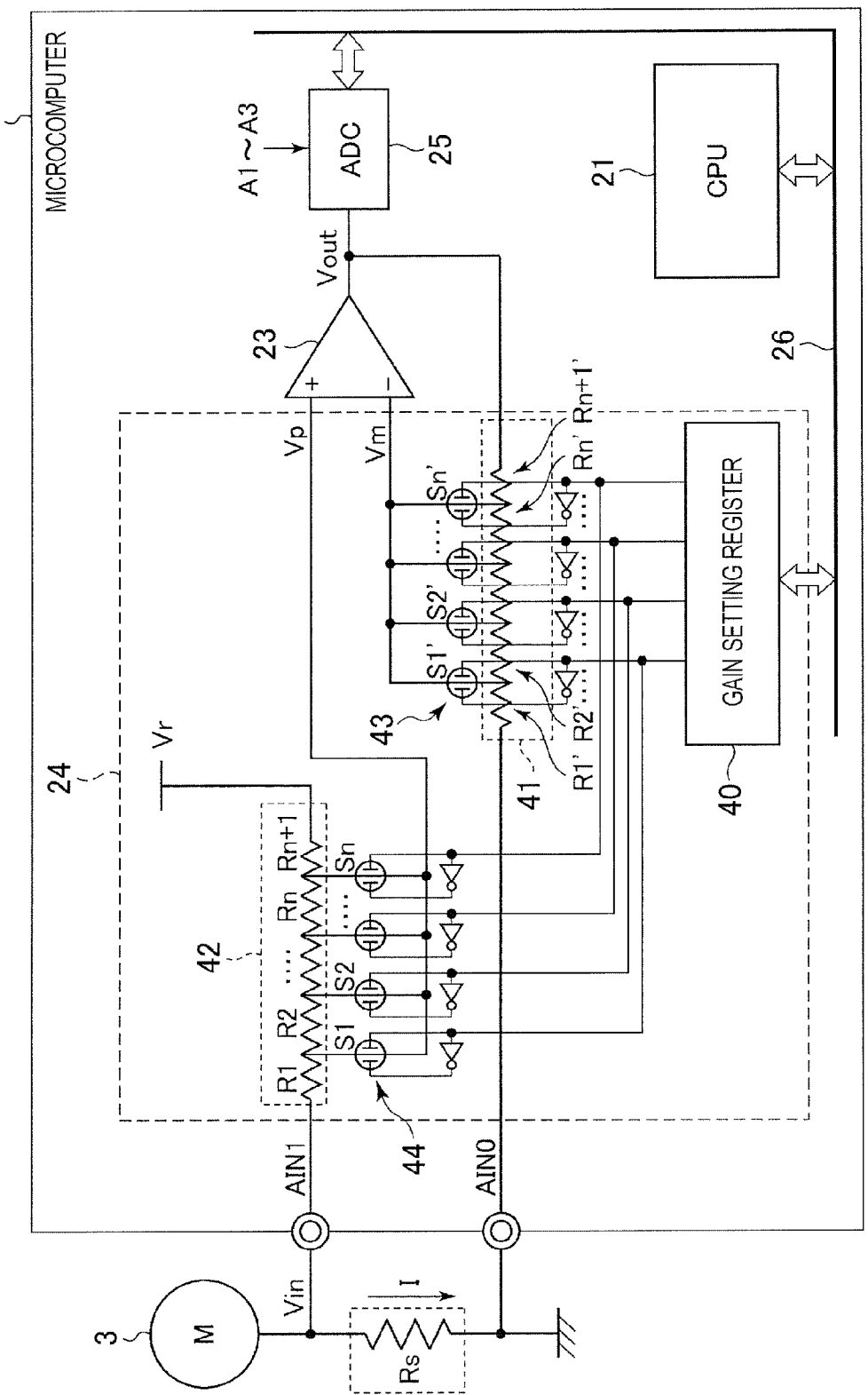
FIG. 2 is a block diagram illustrating a configuration example of a microcomputer according to a first embodiment.

Subsequently, the gain control circuit 24 and the operational amplifier 23 will be further described. FIG. 2 is a block diagram illustrating a configuration example of the microcomputer (semiconductor device) 2 according to this embodiment. In this figure, the timer circuit 22 is omitted. Also, the inverter circuit 4 except for the shunt resistor Rs is also omitted.

The gain control circuit 24 includes a gain switching resistor group 41, a first analog switch group 43, an offset adjustment resistor group 42, a second analog switch group 44, a gain setting register 40, and an operational amplifier (first amplifier) 23. The gain switching resistor group 41 has a plurality of first resistors $R_1', R_2', \ldots, R_{n+i}'$ connected in series with each other. The first analog switch group 43 has a plurality of first analog switches $S_1', S_2', \ldots, S_n'$ connected in parallel to each other. Those first analog switches S1', S2', . . ., Sn" selects at least one of those first resistors R1', R2', . . . , $R_{n+1}$. The offset adjustment resistor group 42 has a plurality of second resistors $R_1, R_2, \ldots, R_{n+1}$ connected in series with each other. The second analog switch group 44 has a plurality of second analog switches $S_i, S_2, \ldots, S_n$ connected in parallel to each other. Those second analog switches $S_i, S_2, \ldots, S_n$ select at least one of those second resistors $R_1, R_2, \ldots, R_{n+1}$. The gain setting register 40 outputs a signal corresponding to a set value, to thereby selectively turn on one of those first analog switches $S_1', S_2', \ldots, S_n'$, and one of those second analog switches $S_1, S_2, \ldots, S_n$. The operational amplifier (first amplifier) 23 is connected with the first analog switch group 43 and the second analog switch group 44.

The gain switching resistor group 41 has one end connected to a first analog input terminal AIN0, and the other end connected to the output voltage Vout of the operational amplifier 23. In other words, one end of the first resistor $R_1'$ is connected to the first analog input terminal AIN0, and the other end of the first resistor $R_{n+1}'$ is connected to the output voltage Vout of the operational amplifier 23. Also, the respective connection points (a connection point between $R_1'$ and $R_2'$, a connection point between $R_2'$ and $R_3'$, a connection point between $R_n'$ and $R_{n+1}'$) of those first resistors $R_1', R_2', \ldots, R_{n+1}'$ are connected with the respective one ends of those first analog switches $S_i', S_2', \ldots, S_n'$. The respective other ends of those first analog switches $S_i', S_2', \ldots, S_n'$ are connected to an inverting input terminal (− terminal) of the operational amplifier 23. In other words, a connection point between the first resistors $R_i'$ and $R_{i+1}'$ (i is a natural number of 1 or more and n or lower) is connected with one end of the first analog switch $S_i'$. The other end of the first analog switch $S_i'$ is connected to the inverting input terminal (− terminal) of the operational amplifier 23. The resistance values of the respective first resistors R' in the gain switching resistor group 41 are, for example, designed with several kΩ to 100 kΩ as an order. The first analog switch S' is, for example, a transfer gate. In the example of this figure, one end of the gain switching resistor group 41 is grounded through the first analog input terminal AIN0.

The offset adjustment resistor group 42 has one end connected to a second analog input terminal AIN1, and the other end connected to a reference voltage Vr. In other words, one end of the second resistor $R_1$ is connected to the second analog input terminal AIN1, and the other end of the second resistor $R_{n+1}$ is connected to the reference voltage Vr. Also, the respective connection points (a connection point between $R_1$ and $R_2$, a connection point between $R_2$ and $R_3$, . . . , a connection point between $R_n$ and $R_{n+1}$) of those second resistors $R_1, R_2, \ldots, R_{n+1}$ are connected with the respective one ends of those second analog switches $S_1, S_2, \ldots, S_n$. The respective other ends of those second analog switches $S_1, S_2, \ldots, S_n$ are connected to a non-inverting input terminal (+ terminal) of the operational amplifier 23. In other words, a connection point between the second resistors $R_i$ and $R_{i+1}$ is connected with one end of the second analog switch $S_i$. The other end of the second analog switch $S_i$ is connected to the non-inverting input terminal (+ terminal) of the operational amplifier 23. The resistance values of the respective second resistors R in the offset adjustment resistor group 42 are, for example, designed with several kΩ to 100 kΩ as an order. The second analog switch S is, for example, a transfer gate. The reference voltage Vr is set so that an input voltage Vp of the non-inverting input terminal of the operational amplifier 23 does not become minus even if a voltage Vin of the node n1 is minus potential. This is because a reference of the operational amplifier 23 is set to GND (ground).

The gain setting register 40 is used commonly to the plurality of first analog switches $S_1', S_2', S_n'$, and the plurality of second analog switches $S_1, S_2, \ldots, S_n$. Therefore, when the first analog switch $S_i'$ is selected and turned on, the second analog switch $S_i$ is selected and turned on at the same time. In this case, in the gain switching resistor group 41, the first resistors are divided into $R_1'+ \ldots +R_i'$ and $R_{i+1}'+ \ldots +R_{n+1}'$, and a connection point between $R_i'$ and $R_{i+1}'$ is connected to the inverting input terminal (− terminal) of the operational amplifier 23 through the first analog switch $S_i'$ (input voltage Vm). Also, in the offset adjustment resistor group 42, the second resistors are divided into $R_1+ \ldots +R_i$ and $R_{i+1}+ \ldots +R_{n+1}$, and a connection point between $R_i$ and $R_{i+1}$ is connected to the non-inverting input terminal (+ terminal) of the operational amplifier 23 (input voltage Vp). The operational amplifier 23 conducts differential amplifier on the basis of the input voltage Vm of the inverting input terminal, and the input voltage Vp of the non-inverting input terminal, and outputs the output voltage Vout.

The ADC 25 captures the output voltage Vout (analog value) of the operational amplifier 23 in response to trigger signals A1 to A3 from the timer circuit 22, and converts the output voltage Vout into a digital value. Then, the ADC 25 outputs the digital signal to the CPU 21. The trigger signals A1 to A3 correspond to the inverters INV1 to INV3, respectively.

As described above, the shunt resistor Rs is connected between the analog input terminal AIN1 and the analog input terminal AIN0. One end of the shunt resistor Rs is connected to the motor 3 (through the switch transistors TR of the inverter circuit 4), and the other end of the shunt resistor Rs is connected to the GND. A resistance value of the shunt resistor Rs is, for example, designed with several mΩ to 100 mΩ as an order.

The gain control circuit 24 and the operational amplifier 23 in FIG. 2 can be regarded as a programmable gain amplifier. The gain of the programmable gain amplifier, and the common mode rejection ratio are obtained as follows.

As an example, let us consider a case in which a value for turning on the first analog switch Si and the second analog switch Si' is set to the gain setting register 40. It is assumed that the input voltage of the non-inverting input terminal of the operational amplifier 23 is Vp, the input voltage of the inverting input terminal of the operational amplifier 23 is Vm, the input voltage to be input to the analog input terminal AIN1 is Vin, the input voltage to be input to the analog input terminal AIN0 is Vss, and the reference voltage is Vr. Also, the non-inverting input voltage Vp and the inverting input voltage Vm of the operational amplifier 23 are virtually grounded, and therefore become the same potential, and this potential is set as Va. Since currents flowing in $R_1+ \ldots +R_i$ and $R_{i+1}+ \ldots +R_{n+1}$ are the same, the following Expression (1) is satisfied.

$$\frac{V_a - V_{in}}{R_1 + R_2 + \ldots + R_i} = \frac{V_r - V_a}{R_{i+1} + R_{i+2} + \ldots + R_{n+1}} \quad (1)$$

Also, since the currents flowing in $R_1'+ \ldots +R_i'$ and $R_{i+1}'+ \ldots +R_{n+1}'$ are the same, Expression (2) is satisfied.

$$\frac{V_a - V_{ss}}{R_1' + R_2' + \ldots + R_i'} = \frac{V_{out} - V_a}{R_{i+1}' + R_{i+2}' + \ldots + R_{n+1}'} \quad (2)$$

When Vout is obtained from Expressions (1) and (2), Expression (3) is obtained as follows:

$$V_{out} = \frac{R_1' + R_2' + \ldots + R_{n+1}'}{R_1' + R_2' + \ldots + R_i'} \times \frac{R_{i+1} + R_{i+2} + \ldots + R_{n+1}}{R_1 + R_2 + \ldots + R_{n+1}} \times V_{in} - \frac{R_{i+1}' + R_{i+2}' + \ldots + R_{n+1}'}{R_1' + R_2' + \ldots + R_i'} \times V_{ss} + \frac{R_1' + R_2' + \ldots + R_{n+1}'}{R_1' + R_2' + \ldots + R_i'} \times \frac{R_1 + R_2 + \ldots + R_i}{R_1 + R_2 + \ldots + R_{n+1}} \times V_r \quad (3)$$

In this expression, when a differential gain $G_D$ is obtained assuming that a difference voltage from Vss which is a reference is Vin, Vss in Expression (3) is set to 0, a term of Vr can be deleted because the term is irrelevant to the gain not changed even if Vin is changed. Thus, Expression (4) can be obtained.

$$G_D = \frac{R_1' + R_2' + \ldots + R_{n+1}'}{R_1' + R_2' + \ldots + R_i'} \times \frac{R_{i+1} + R_{i+2} + \ldots + R_{n+1}}{R_1 + R_2 + \ldots + R_{n+1}} \quad (4)$$

Also, since an in-phase gain $G_c$ is a gain when the same signal is input, Vss in Expression (3) is set as Vin, and the term of Vr can be deleted because the term is irrelevant to the gain not changed even if Vin is changed. Thus, Expression (5) can be obtained.

$$G_C = \frac{R_1' + R_2' + \ldots + R_{n+1}'}{R_1' + R_2' + \ldots + R_i'} \times \frac{R_{i+1} + R_{i+2} + \ldots + R_{n+1}}{R_1 + R_2 + \ldots + R_{n+1}} - \frac{R_{i+1}' + R_{i+2}' + \ldots + R_{n+1}'}{R_1' + R_2' + \ldots + R_i'} \quad (5)$$

Therefore, the common mode rejection ratio CMRR is represented as the following Expression (6).

$$CMRR = \frac{G_D}{G_C} \quad (6)$$

$$= \frac{1}{1 - \frac{R'_{i+1} + R'_{i+2} + \ldots + R'_{n+1}}{R_{i+1} + R_{i+2} + \ldots + R_{n+1}} \times \frac{R_1 + R_2 + \ldots + R_n}{R'_1 + R'_2 + \ldots + R'_{n+1}}}$$

In this example, when $(R_{i+1}+ \ldots +R_{n+1})/(R_1+ \ldots +R_i) = (R_{i+1}'+ \ldots +R_{n+1}')/(R_1'+ \ldots R_i')$, Expression (3) is represented as Expression (7).

$$V_{out} = \frac{R_{i+1} + R_{i+2} + \ldots + R_{n+1}}{R_1 + R_2 + \ldots + R_i} \times (V_{in} - V_{ss}) + V_r \quad (7)$$

Also, Expression (6) is represented as Expression (8).

$$CMRR = \infty \quad (8)$$

In the programmable gain amplifier (gain control circuit 24 and operational amplifier 23) according to this embodiment, no analog switch for switching the resistance value to another is provided in paths in which the currents of the gain switching resistor group 41 and the offset adjustment resistor group 42 for setting the gain and the common mode rejection ratio flow. With this configuration, an influence of the on-resistance of the analog switch can be removed. As a result, the gain can be designed with high precision.

Also, the programmable gain amplifier can appropriately set resistance values of the plural first resistors R' in the gain switching resistor group 41, and resistance values of the plural second resistors R in the offset adjustment resistor group 42. With this configuration, the common mode rejection ratio can be appropriately set.

Also, in the programmable gain amplifier, it is preferable that a ratio $(R_{i+1}'+ \ldots +R_{n+1}')/(R_1'+ \ldots +R_i')$ of the resistance values of the plural first resistors R' in the gain switching resistor group 41 is made equal to a ratio $(R_{i+1}+ \ldots +R_{n+1})/(R_1+ \ldots +R_i)$ of the resistance values of the plural second resistors R in the offset adjustment resistor group 42. As a result, the common mode rejection ratio can be improved.

Further, in order to suppress a manufacturing variation of the resistive elements, it is preferable that the resistive elements have the same resistance value and the same shape. In order to satisfy those conditions, it is preferable that the following conditions are satisfied. Specifically, $R_1' = R_1 = R_2' = R_2 = \ldots = R_{n+1}' = R_{n+1}$ is satisfied.

As described above, according to this embodiment, the operational amplifier 23 can conduct amplification with high precision without being affected by the on-resistances of the first analog switches $S_i'$ and the second analog switch $S_i$ (from Expression (3)). Also, if the resistive elements are designed with the resistance values of $(R_{i+1}+ \ldots +R_{n+1})/(R_1+ \ldots +R_i) = (R_{i+1}'+ \ldots +R_{n+1}')/(R_1'+ \ldots +R_i')$, the excellent common mode rejection ratio can be obtained (from Expression (8))

Figure 3:
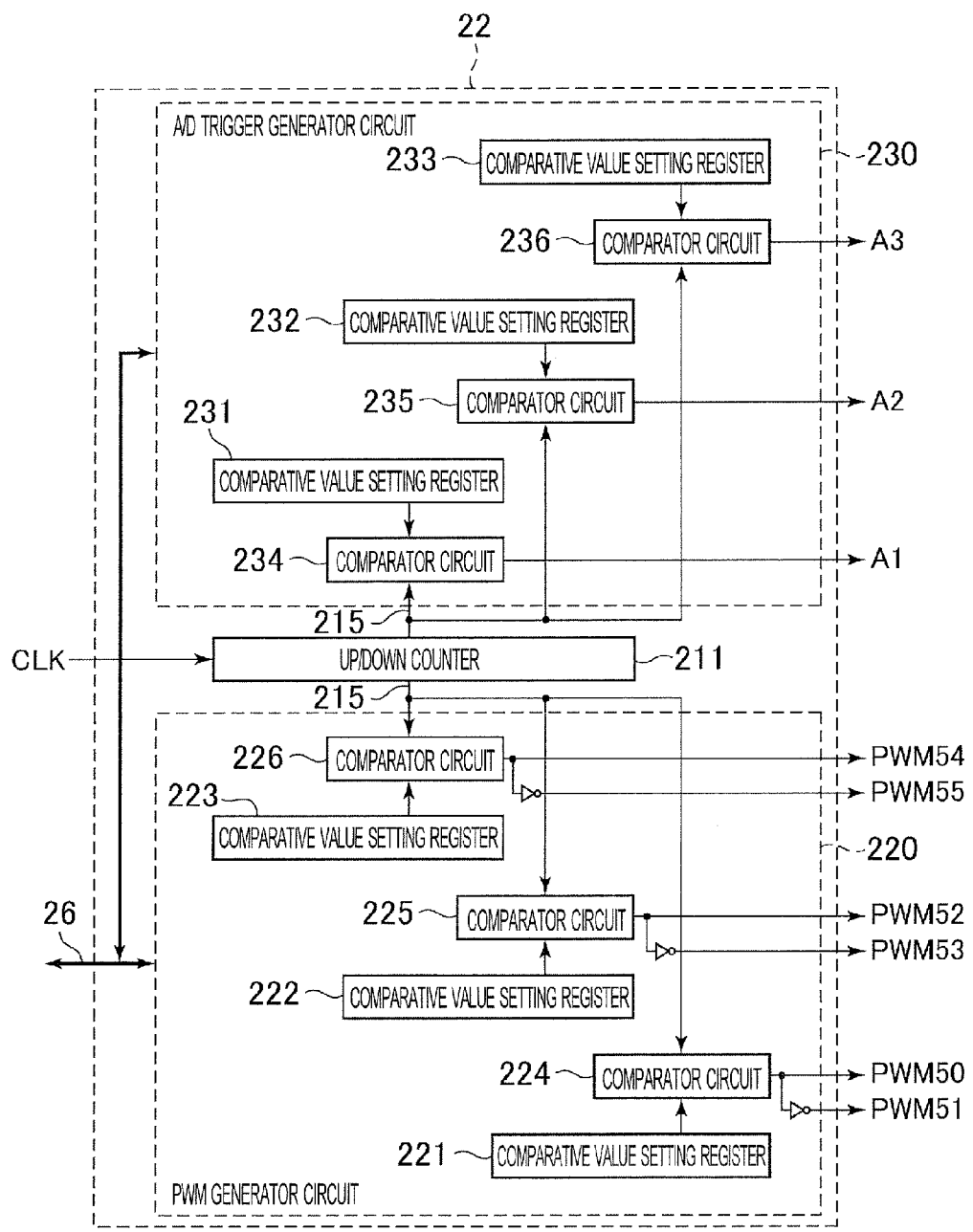
FIG. 3 is a block diagram illustrating a configuration example of a timer circuit in the microcomputer according to the embodiment.

FIG. 3 is a block diagram illustrating a configuration example of the timer circuit 22 in the microcomputer (semiconductor device) 2 according to this embodiment. The timer circuit 22 includes an up/down counter 211, a PWM generator circuit 220, and an A/D trigger generator circuit 230.

The up/down counter 211 counts up a value from 0 of a minimum value to M (M is an integral number) of a maximum value on the basis of an count clock CLK supplied from a clock generator circuit (not shown) within the microcomputer 2. Thereafter, the up/down counter 211 counts down the value to 0. Then, the up/down counter 211 outputs a count value 215 to the PWM generator circuit 220 and the A/D trigger generator circuit 230. The up/down counter 211 repeats the count-up operation and the count-down operation by supply of the count clock CLK.

The PWM generator circuit 220 generates the PWM signal for controlling the inverter circuit 4 on the basis of the count value 215, and outputs the PWM signal to the inverter circuit 4. Specifically, the PWM generator circuit 220 includes a U-phase PWM timer, a V-phase PWM timer, and a W-phase PWM timer. The U-phase PWM timer outputs the PWM signal 50 of the U-phase, and the PWM signal 51 corresponding to a reverse phase of the U-phase. The V-phase PWM timer outputs the PWM signal 52 of the V-phase, and the PWM signal 53 corresponding to a reverse phase of the V-phase. The W-phase PWM timer outputs the PWM signal 54 of the W-phase, and the PWM signal 55 corresponding to a reverse phase of the W-phase.

The U-phase PWM timer includes a comparator circuit 224, and a comparative value setting register 221. The comparative value setting register 221 sets a pulse width of the PWM signal 50 in a given period. The comparator circuit 224 compares the count value 215 of the up/down counter 211 with the comparative value setting register 221, and inverts the PWM signal 50 which is an output when the count value 215 and the comparative value setting register 221 match each other. With this operation, the PWM signal 51 which is an inversion signal of the PWM signal 50 is also inverted. Then, the above operation is repeated to periodically repeat the output of the PWM signal.

Likewise, the V-phase PWM timer includes a comparator circuit 225, and a comparative value setting register 222. The comparative value setting register 222 sets a pulse width of the PWM signal 52 in a given period. The comparator circuit 225 compares the count value 215 of the up/down counter 211 with the comparative value setting register 222, and inverts the PWM signal 52 which is an output when the count value 215 and the comparative value setting register 222 match each other. With this operation, the PWM signal 53 which is an inversion signal of the PWM signal 52 is also inverted. Then, the above operation is repeated to periodically repeat the output of the PWM signal.

Likewise, the W-phase PWM timer includes a comparator circuit 226, and a comparative value setting register 223. The comparative value setting register 223 sets a pulse width of the PWM signal 54 in a given period. The comparator circuit 226 compares the count value 215 of the up/down counter 211 with the comparative value setting register 223, and inverts the PWM signal 54 which is an output when the count value 215 and the comparative value setting register 223 match each other. With this operation, the PWM signal 53 which is an inversion signal of the PWM signal 54 is also inverted. Then, the above operation is repeated to periodically repeat the output of the PWM signal.

The contents of the comparative value setting registers 221, 222, and 223 of the PWM signals 50, 52, and 54 are transferred from the CPU 21 through the bus 26. The PWM signals 51, 53, and 55 are obtained as signals in which the PWM signals 50, 52, and 54 are inverted. The PWM signals of different pulse widths corresponding to the U-phase, the V-phase, and the W-phase are output on the basis of the setting of the CPU 21.

The A/D trigger generator circuit 230 generates a trigger signal for starting A/D conversion in the ADC 25 on the basis of the count value 215, and outputs the trigger signal to the ADC 25. Specifically, the A/D trigger generator circuit 230 includes a U-phase ADC timer, a V-phase ADC timer, and a W-phase ADC timer. The U-phase ADC timer outputs the trigger signal A1 of the U-phase. The V-phase ADC timer outputs the trigger signal A2 of the V-phase. The W-phase ADC timer outputs the trigger signal A3 of the W-phase.

The U-phase ADC timer includes a comparator circuit 234, and a comparative value setting register 231. The comparative value setting register 231 sets a value for generating a timing at which a voltage (which is the voltage Vin of the node n1, and in this example, the output voltage Vout amplified by the operational amplifier 23) of an analog signal from the inverter circuit 4 which is changed with the output of the PWM signal 50 is subjected to A/D conversion. When counting up, the comparator circuit 234 compares the count value 215 with the set value in the comparative value setting register 231, and outputs the trigger signal A1 for starting the A/D conversion, which is an output when the count value 215 and the set value in the comparative value setting register 231 match each other. Then, the above operation is repeated to periodically repeat the output of the trigger signal A1.

The V-phase ADC timer includes a comparator circuit 235, and a comparative value setting register 232. The comparative value setting register 232 sets a value for generating a timing at which a voltage (which is the voltage Vin of the node n1, and in this example, the output voltage Vout amplified by the operational amplifier 23) of the analog signal 27 from the inverter circuit 4 which is changed with the output of the PWM signal 52 is subjected to A/D conversion. When counting up, the comparator circuit 235 compares the count value 215 with the set value in the comparative value setting register 232, and outputs the trigger signal A2 for starting the A/D conversion, which is an output when the count value 215 and the set value in the comparative value setting register 232 match each other. Then, the above operation is repeated to periodically repeat the output of the trigger signal A2.

The W-phase ADC timer includes a comparator circuit 236, and a comparative value setting register 233. The comparative value setting register 233 sets a value for generating a timing at which a voltage (which is the voltage Vin of the node n1, and in this example, the output voltage Vout amplified by the operational amplifier 23) of the analog signal 27 from the inverter circuit 4 which is changed with the output of the PWM signal 54 is subjected to A/D conversion. When counting up, the comparator circuit 236 compares the count value 215 with the set value in the comparative value setting register 233, and outputs the trigger signal A3 for starting the A/D conversion, which is an output when the count value 215 and the set value in the comparative value setting register 233 match each other. Then, the above operation is repeated to periodically repeat the output of the trigger signal A3. In this example, the comparator circuits 234, 235, and 236 can output three trigger signals A1, A2, and A3 in the count-down, or both of the count-up and the count-down.

The contents of the comparative value setting registers 231, 232, and 233 of the trigger signals A1, A2, and A3 are transferred from the CPU 21 through the bus 26. The trigger signals of different timings corresponding to the U-phase, the V-phase, and the W-phase are output on the basis of the setting of the CPU 21.

Figure 4:
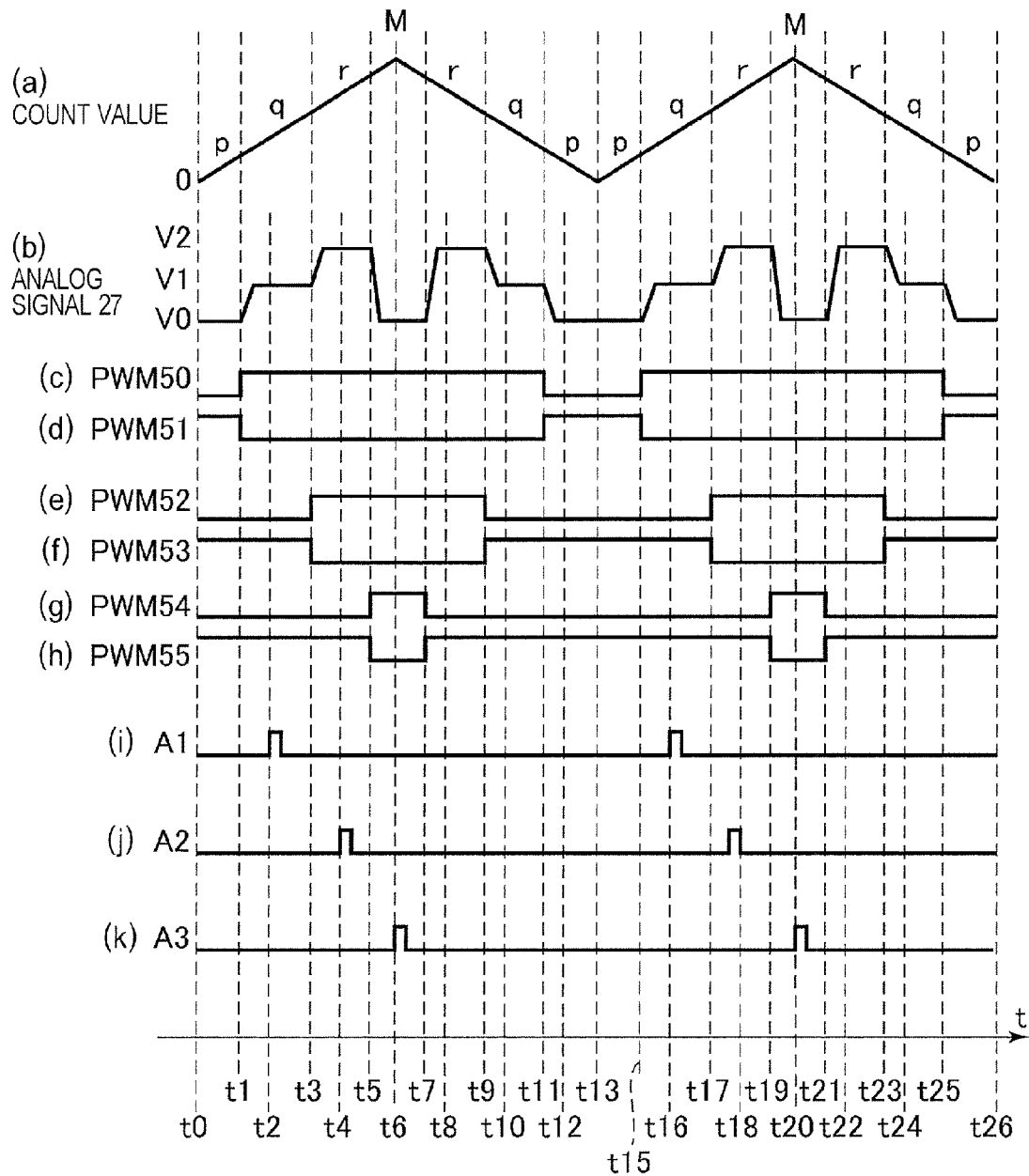
FIGS. 4A to 4K are timing charts illustrating the operation of the motor control system having the inverter system according to the embodiment.

Subsequently, the operation of the motor control system having the inverter system according to this embodiment will be described. FIGS. 4A to 4K are timing charts illustrating the operation of the motor control system having the inverter system according to this embodiment. FIG. 4A illustrates the count value 215. FIG. 4B illustrates the analog signal 27 (voltage Vin of the node n1). FIGS. 4C to 4H illustrate the PWM signals 50 to 55, respectively. FIGS. 4I to 4J illustrate the trigger signals A1 to A3 at the time of count-up, respectively.

The CPU 21 stores a value suitable for controlling the motor 3 in the gain setting register 40 in advance. That value may be input by a user, a value associated with the motor 3 within a database (not shown) may be referred to, or a predetermined value may be used. In this example, it is assumed that values for selecting the first analog switch $S_i'$ and the second analog switch $S_i$ from the first analog switches S1' to Sn' and the second analog switches S1 to Sn are stored in the gain setting register 40. The first analog switch $S_i'$ and the second analog switch $S_i$ are selected according to the values of the gain setting register 40. As a result, a connection point between the first resistor $R_i'$ and the first resistor $R_{i+1}'$ is connected to the inverting input terminal (− terminal) of the operational amplifier 23. Also, a connection point between the second resistor $R_i$ and the second resistor $R_{i+1}$ is connected to the non-inverting input terminal (+ terminal) of the operational amplifier 23. The value of the gain setting register 40 can be changed by the CPU 21 even during the operation of the inverter system.

The count value 215 of the up/down counter 211 in FIG. 4A is counted up from 0, passes through count values p, q, and r (p, q, and r are natural numbers, p<q<r), and arrives at a maximum value M. Thereafter, the count value 215 is counted down, passes through the count values r, q, and p, and arrives at 0. Thereafter, the count value 215 is again counted up. For example, when the up/down counter 211 is a 16-bit counter, the up/down counter 211 counts up the value from 0 to 65535 (decimal). Thereafter, when the count value 215 counts down the value, and becomes 0, the count value 215 again counts up the value.

The PWM signal 50 in FIG. 4C rises up from a low level ("0") to a high level ("1") at a timing t1 when the count value 215 is incremented from 0, and becomes p. Then, the PWM signal 50 falls down at a timing t11 when the count value 215 is decremented, and again becomes p. When the count value 215 becomes 0, the count value 215 is again incremented, and the same operation is subsequently repeated. The PWM signal 51 in FIG. 4D is an inversion output of the PWM signal 50. The PWM signal 52 in FIG. 4E rises up from the low level ("0") to the high level ("1") at a timing t3 when the count value 215 is incremented from 0, and becomes q. Then, the PWM signal 52 falls down at a timing t9 when the count value 215 is decremented, and again becomes q. When the count value 215 becomes 0, the count value 215 is again incremented, and the same operation is subsequently repeated. The PWM signal 53 in FIG. 4F is an inversion output of the PWM signal 52. The PWM signal 54 in FIG. 4G rises up from the low level ("0") to the high level ("1") at a timing t5 when the count value 215 is incremented from 0, and becomes r. Then, the PWM signal 54 falls down at a timing t7 when the count value 215 is decremented, and again becomes r. When the count value 215 becomes 0, the count value 215 is again incremented, and the same operation is subsequently repeated. The PWM signal 55 in FIG. 4H is an inversion output of the PWM signal 54.

The trigger signal A1 in FIG. 4I is output as a one-shot pulse at a timing t2 when the count value 215 is incremented from 0, and becomes (p+α1). When the count value 215 is decremented, and becomes 0, the count value 215 is again incremented, and the same operation is subsequently repeated. The trigger signal A2 in FIG. 4J is output as the one-shot pulse at a timing t4 when the count value 215 is incremented from 0, and becomes (q+α2). When the count value 215 is decremented, and becomes 0, the count value 215 is again incremented, and the same operation is subsequently repeated. The trigger signal A3 in FIG. 4K is output as the one-shot pulse at a timing t6 when the count value 215 is incremented from 0, and becomes (r+α3). When the count value 215 is decremented, and becomes 0, the count value 215 is again incremented, and the same operation is subsequently repeated.

A period called "dead time" is generally provided so that the change timings of the PWM signal 50 and the PWM signal 51 do not overlap with each other, and the output is controlled so that the change timings are displaced from each other. However, for facilitation of understanding, this embodiment will be described with reference to the timing when there is provided no dead time. The same is applied to the PWM signal 52, the PWM signal 53, and the PWM signal 54, the PWM signal 55.

The switch elements TR1 to TR6 of the inverter circuit 4 turn on or off according to the above PWM signals 50 to 55 of six phases. As a result, as illustrated in FIG. 4B, the analog signal 27 to the microcomputer 2 is changed. Specifically, the analog signal 27 is changed as follows.

First, in a period from t0 to t1, because all of the PWM signal 50, the PWM signal 52, and the PWM signal 54 are "0" output, all of the switch elements TR1, TR3, and TR5 turn off. As a result, no current flows in the motor 3, and the node n1 becomes low level V0, that is, the analog signal 27 becomes low level V0.

Thereafter, in a period from t1 to t3, because the PWM signal 50, the PWM signal 53, and the PWM signal 55 are "1" output, the switch elements TR1, TR4, and TR6 turn on, and the switch elements TR2, TR3, and TR5 turn off. As a result, a current flows through the switch elements of the on-state, and the motor 3, whereby the voltage of the node n1 rises from 0, and the analog signal 27 becomes V1. Then, at the time t2, the ADC 25 detects the analog signal 27 which has become V1.

Subsequently, in a period from t3 to t5, because the PWM signal 50, the PWM signal 52, and the PWM signal 55 are "1" output, the switch elements TR1, TR3, and TR6 turn on, and the switch elements TR2, TR4, and TR5 turn off. As a result, a current flows through the switch elements of the on-state, and the motor 3, whereby the voltage of the node n1 rises from V1, and the analog signal 27 becomes V2. The low level V0 is not limited to 0 [V], but changed according to the design conditions of the inverter circuit 4. Then, at the time t4, the ADC 25 detects the analog signal 27 which has become V2.

Subsequently, in a period from t5 to t7, because all outputs of the PWM signal 51, the PWM signal 53, and the PWM signal 55 are "0" output, all of the switch elements TR2, TR4, and TR6 turn off. As a result, no current flows in the motor 3, and the node n1 becomes low level V0, that is, the analog signal 27 becomes low level V0. Then, at t6, the ADC 25 detects the analog signal 27 which has become V0.

Subsequently, in a period from t7 to t9, because the PWM signal 50, the PWM signal 52, and the PWM signal 55 are "1" output, the switch elements TR1, TR3, and TR6 turn on, and the switch elements TR2, TR4, and TR5 turn off. As a result, a current flows through the switch elements of the on-state, and the motor 3, whereby the voltage of the node n1 again rises, and the analog signal 27 becomes V2.

Subsequently, in a period from t9 to t11, because the PWM signal 50, the PWM signal 53, and the PWM signal 55 are "1" output, the switch elements TR1, TR4, and TR6 turn on, and the switch elements TR2, TR3, and TR5 turn off. As a result, a current flows through the switch elements of the on-state, and the motor 3 whereby the voltage of the node n1 falls from V2, and the analog signal 27 becomes V1.

Subsequently, in a period from t11 to t13, because all of the PWM signal 50, the PWM signal 52, and the PWM signal 54 are "0" output, all of the switch elements TR1, TR3, and TR5 turn off. As a result, no current flows in the motor 3, and the node n1 becomes low level V0, that is, the analog signal 27 becomes low level V0.

In a period from t13 to t26, the PWM outputs of the six phases are output at the same timing as that in the period from t0 to t13. Therefore, the analog signal 27 is also changed in the same manner as that in the period from t0 to t13.

As described above, the motor control system having the inverter system according to this embodiment operates.

In this embodiment, the first analog switch group 43 and the second analog switch group 44 turn on/off by setting the gain setting register 40, thereby being capable of freely adjusting the resistance values of the gain switching resistor group 41 and the offset adjustment resistor group 42 related to the common mode rejection ratio and the gain. As a result, the common mode rejection ratio can be appropriately adjusted, and the noise can be appropriately suppressed. Also, in this embodiment, a current can be prevented from flowing into the first analog switch group 43 and the second analog switch group 44. As a result, the influence of the on-resistance of those analog switches can be removed, and the signal can be amplified with high precision.

Second Embodiment

This embodiment is different from the gain control circuit 24 of the first embodiment in that the reference voltage Vr in a gain control circuit 24a of the microcomputer can be freely set. Hereinafter, the differences will be mainly described.

Figure 5:
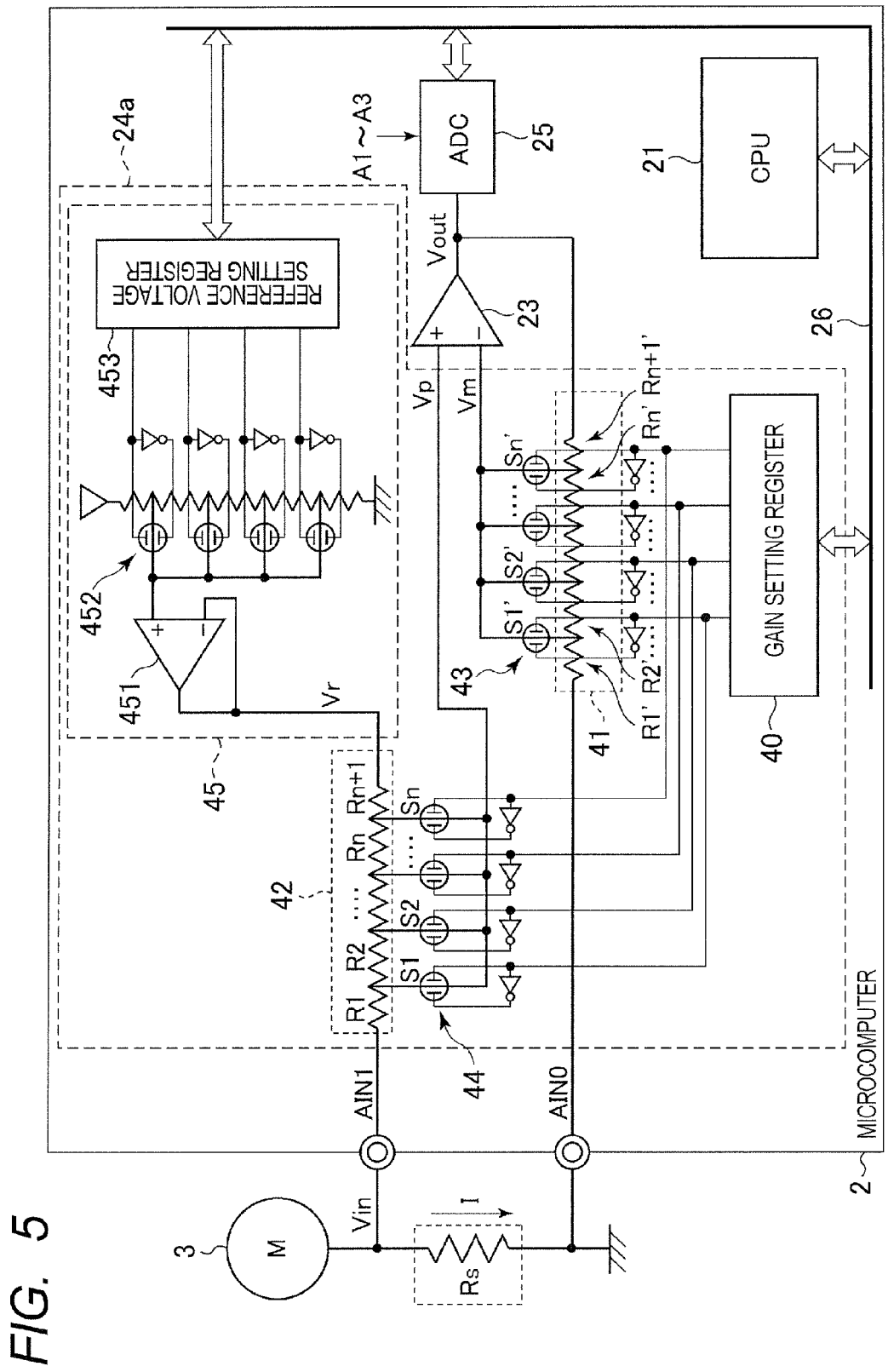
FIG. 5 is a block diagram illustrating a configuration example of a microcomputer according to a second embodiment.

The gain control circuit 24a and the operational amplifier 23 will be further described. FIG. 5 is a block diagram illustrating a configuration example of the microcomputer (semiconductor device) 2 according to this embodiment. In this figure, the timer circuit 22 is omitted from illustration. Also, the inverter circuit 4 except for the shunt resistor Rs is also omitted from illustration.

The gain control circuit 24a further includes a reference voltage source 45 in addition to the configuration (the gain switching resistor group 41, the first analog switch group 43, the offset adjustment resistor group 42, the second analog switch group 44, and the gain setting register 40) according to the first embodiment. The reference voltage source 45 is connected to the other end of the offset adjustment resistor group 42, and changeably applies the reference voltage Vr. In other words, the reference voltage Vr to be applied to the offset adjustment resistor group 42 can be changed by the reference voltage source 45.

When the common mode rejection ratio is optimized, the analog switches ($S_i'=S_i$) at the same position of the offset adjustment resistor group 42 and the gain switching resistor group 41 are selected. In this case, if the reference voltage Vr is fixed, the input voltage Vp of the operational amplifier may fall outside a voltage range that can be input to the operational amplifier 23, or the output voltage Vout of the operational amplifier 23 may exceed a range that can be output by the operational amplifier. This causes a conversion precision to be degraded such that the output voltage Vout of the operational amplifier 23 is distorted, or an input range of the ADC 25 is not effectively used. In order to avoid this case, in this embodiment, the reference voltage Vr is made variable with the use of the reference voltage source 45, a range of the input/output of the operational amplifier 23 is optimally used, and the input range of the ADC 25 is effectively used to improve the precision.

The reference voltage source 45 includes a reference voltage operational amplifier (second amplifier) 451, a digital/analog converter (DAC) 452, and a reference voltage setting register 453. The reference voltage setting register 453 stores a set value (digital value) for setting the digital/analog converter 452. The set value corresponds to the reference voltage Vr, and is rewritable by the CPU 21.

The DAC 452 converts a digital value (set value) of the reference voltage setting register 453 into an analog value. In an example of this drawing, the DAC 452 is a resistor string DAC, and includes a plurality of resistors, and a plurality of switches. Those resistors have the same resistance value, and are connected in series with each other (resistor string), and the reference voltage is applied to both ends of the resistor string. The respective one ends of a plurality of connection points in the resistor string are connected with the respective one ends of the switches. The respective other ends of the switches are connected to a non-inverting input terminal (+ terminal) of the reference voltage operational amplifier 451. One of those switches is selected in correspondence with the set value (digital value) of the reference voltage setting register 453. A voltage (analog value) of a position of the selected switch is output to the reference voltage operational amplifier 451 by a voltage of a voltage division ratio in the resistor string. The DAC 452 may be a DAC of another type.

The reference voltage operational amplifier (second amplifier) 451 makes up a voltage follower. That is, the non-inverting input terminal (+ terminal) of the reference voltage operational amplifier 451 is connected to the DAC 452, and the inverting input terminal (− terminal) of the reference voltage operational amplifier 451 is connected to the output terminal. The reference voltage operational amplifier 451 applies the output voltage from the DAC 452 to the offset adjustment resistor group 42 as the reference voltage Vr.

Similarly, according to this embodiment, as in the first embodiment, in order to optimize the common mode rejection ratio of the operational amplifier 23, the analog switches ($S_i=S_i'$) at the same locations are selected so that $(R_{i+1}+ \ldots +R_{n+1})/(R_1+ \ldots +R_i)=(R_{i+1}'+ \ldots +R_{n+1}')/(R_1'+ \ldots +R_i')$ is satisfied. In this situation, according to this embodiment, the value of the reference voltage setting register 453 is set so that the input voltage Vp to be applied to the non-inverting input terminal (+ terminal) of the operational amplifier 23 falls within a range that can be input to the operational amplifier 23, to thereby offset a voltage level of the voltage Vin. In this situation, the respective setting registers 40 and 453 are set so that the output voltage Vout of the operational amplifier 23 does not exceed the input range of the ADC 25.

As described above, the reference voltage source 45 converts a value stored in the reference voltage setting register 453 into an analog signal through the CPU 21 by the DAC 452, and supplies the converted value to the offset adjustment resistor group 42 from the reference voltage operational amplifier 451 as the reference voltage Vr.

Figure 6A:
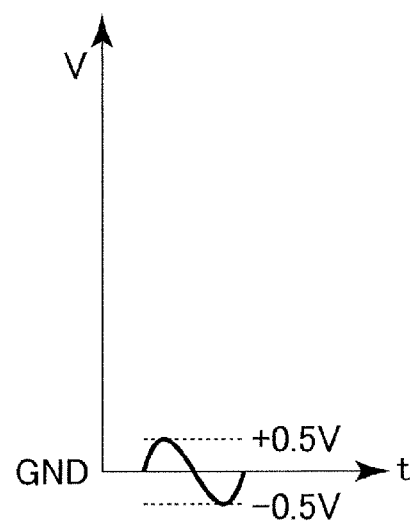
FIG. 6A is a graph illustrating a relationship between a reference voltage and an analog input voltage.
Figure 6B:
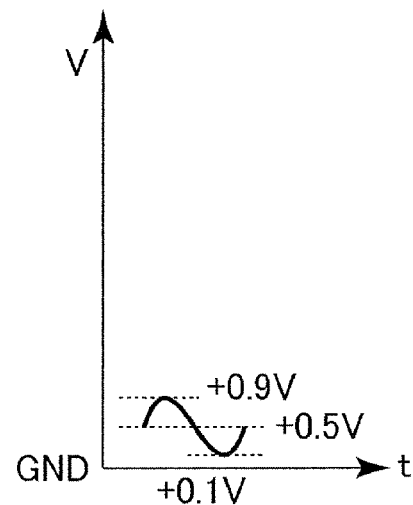
FIG. 6B is a graph illustrating a relationship between the reference voltage and an operational amplifier non-inverting input voltage.
Figure 6C:
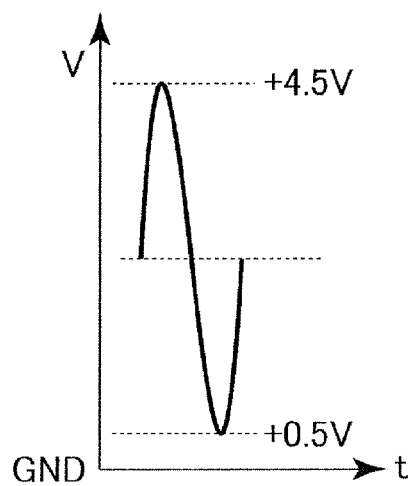
FIG. 6C is a graph illustrating a relationship between the reference voltage and an operational amplifier output voltage.
Figure 7A:
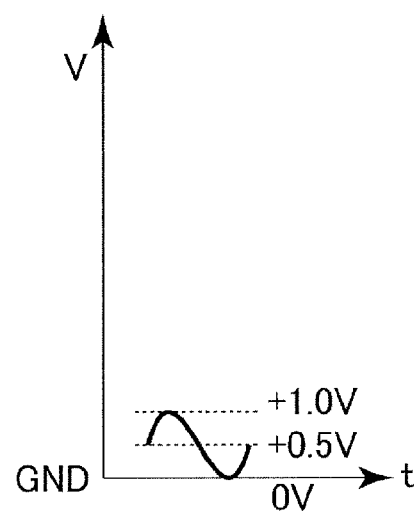
FIG. 7A is a graph illustrating a relationship between the reference voltage and the analog input voltage.
Figure 7B:
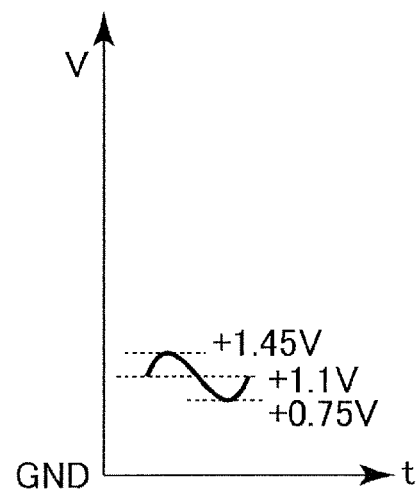
FIG. 7B is a graph illustrating a relationship between the reference voltage and the operational amplifier non-inverting input voltage.
Figure 7C:
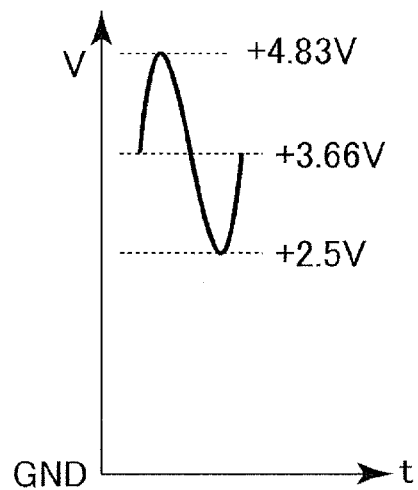
FIG. 7C is a graph illustrating a relationship between the reference voltage and the operational amplifier output voltage.
Figure 8A:
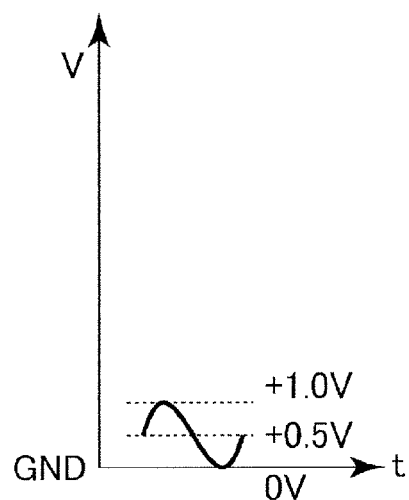
FIG. 8A is a graph illustrating a relationship between the reference voltage and the analog input voltage.
Figure 8B:
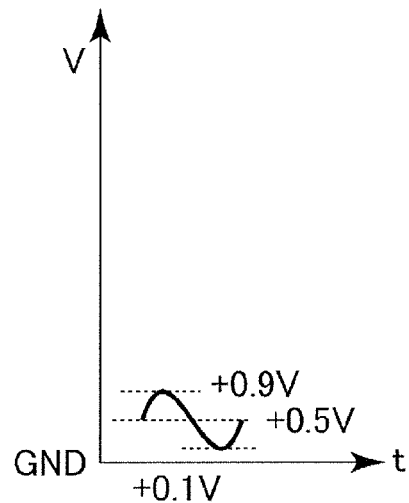
FIG. 8B is a graph illustrating a relationship between the reference voltage and the operational amplifier non-inverting input voltage.
Figure 8C:
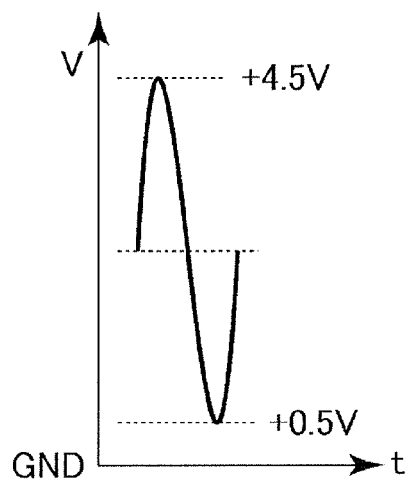
FIG. 8C is a graph illustrating a relationship between the reference voltage and the operational amplifier output voltage.

Subsequently, a gain dependency of relationships between the reference voltage Vr, and the analog input voltage Vin, the operational non-inverting input voltage Vp, the operational output voltage Vout will be described. FIGS. 6A to 6C, 7A to 7C, and 8A to 8C are graphs illustrating the gain dependency of the relationships between the reference voltage Vr, and the analog input voltage Vin, the operational amplifier non-inverting input voltage Vp, the operational amplifier output voltage Vout. In FIGS. 6A, 7A, and 8A, the axis of ordinate represents the input voltage Vin, and the axis of abscissa represents a time t. In FIGS. 6B, 7B, and 8B, the axis of ordinate represents the operational amplifier non-inverting input voltage Vp, and the axis of abscissa represents the time t. In FIGS. 6C, 7C, and 8C, the axis of ordinate represents the input voltage Vout, and the axis of abscissa represents a time t. In this example, an input range of the ADC 25 is common, for example, 0 to 5 V. It is assumed that $R_1+R_2+ \ldots +R_i=R_1'+R_2'+ \ldots +R_i'=12$ kΩ and $R_{i+1}+R_{i+2}+ \ldots +R_{n+1}=R_{i+1}'+R_{i+2}'+ \ldots R_{n+1}'=28$ kΩ are satisfied. It is assumed that the resistance value of the shunt resistor Rs is 10 mΩ.

Referring to FIGS. 6A to 6C, when the reference voltage Vr is 2.5 V, and an amplitude of the analog input voltage Vin is −0.5 V to +0.5 V (FIG. 6A), an amplitude of the operational amplifier non-inverting input voltage Vp is +0.1 V to +0.9 V (FIG. 6B). If the gain is 4.0 times, the amplitude of the operational amplifier output voltage Vout becomes +0.5 V to +4.5 V (FIG. 6C), and the input range of the ADC 25 can be effectively used.

In this example, referring to FIGS. 7A to 7C, when the reference voltage Vr is fixed to 2.5 V, and the amplitude of the analog input voltage Vin is 0 V to +1.0V (FIG. 7A), the amplitude of the operational amplifier non-inverting input voltage Vp is +0.75 V to +1.45 V (FIG. 6B). If the gain is 2.33 times, the amplitude of the operational amplifier output voltage Vout becomes +2.5 V to +4.83 V (FIG. 7C), and can fall within the input range of the ADC 25. Conversely, if the gain exceeds 2.33 times, the amplitude of the operational amplifier output voltage Vout exceeds the input range of the ADC 25. Further, in this case, since the amplitude of the operational amplifier output voltage Vout becomes +2.5 V to +4.83 V, only the half of the input range of the ADC 25 can be used.

Under the circumstances, referring to FIGS. 8A to 8C, when the reference voltage Vr is variable, and the reference voltage Vr is set to, for example, 0.5 V. In this case, if the amplitude of the analog input voltage Vin is 0 V to +1.0 V (FIG. 8A), the amplitude of the operational amplifier non-inverting input voltage Vp is +0.1 V to +0.9 V (FIG. 8B). If the gain is 4.0 times, the amplitude of the operational amplifier output voltage Vout becomes +0.5 V to +4.5 V (FIG. 8C), and the input range of the ADC 25 can be effectively used.

As described above, the reference voltage Vr is variable, and changed according to the amplitude of the analog input voltage Vin with results that the input range of the ADC 25 can be effectively used, and the precision of the amplification can be improved. The resistance value of the shunt resistor Rs is 10 mΩ, and the first resistors R' and the second resistor R are the order of 10 kΩ. Since there is a difference of the sixth power of 10, the shunt resistor Rs is omitted from calculation.

The operation of the motor control system having the inverter system according to this embodiment is identical with that in the first embodiment except that the CPU 21 changes the value of the reference voltage setting register 453 to adjust the value of the reference voltage Vr in advance or during the operation. Therefore, the repetitive description will be omitted.

Similarly in this embodiment, the same advantages as those in the first embodiment can be obtained. Also, in this embodiment, the reference voltage Vr is variable, and can be changed according to the amplitude of the analog input voltage Vin, the input range of the ADC 25 can be effectively used, and the precision of the amplification can be improved.

Third Embodiment

This embodiment is different from the gain control circuit 24a of the second embodiment in that the setting registers of the first analog switch $S_i$ and the second analog switch $S_i$ are not shared, but disposed, individually. Hereinafter, the differences will be mainly described.

Figure 9:
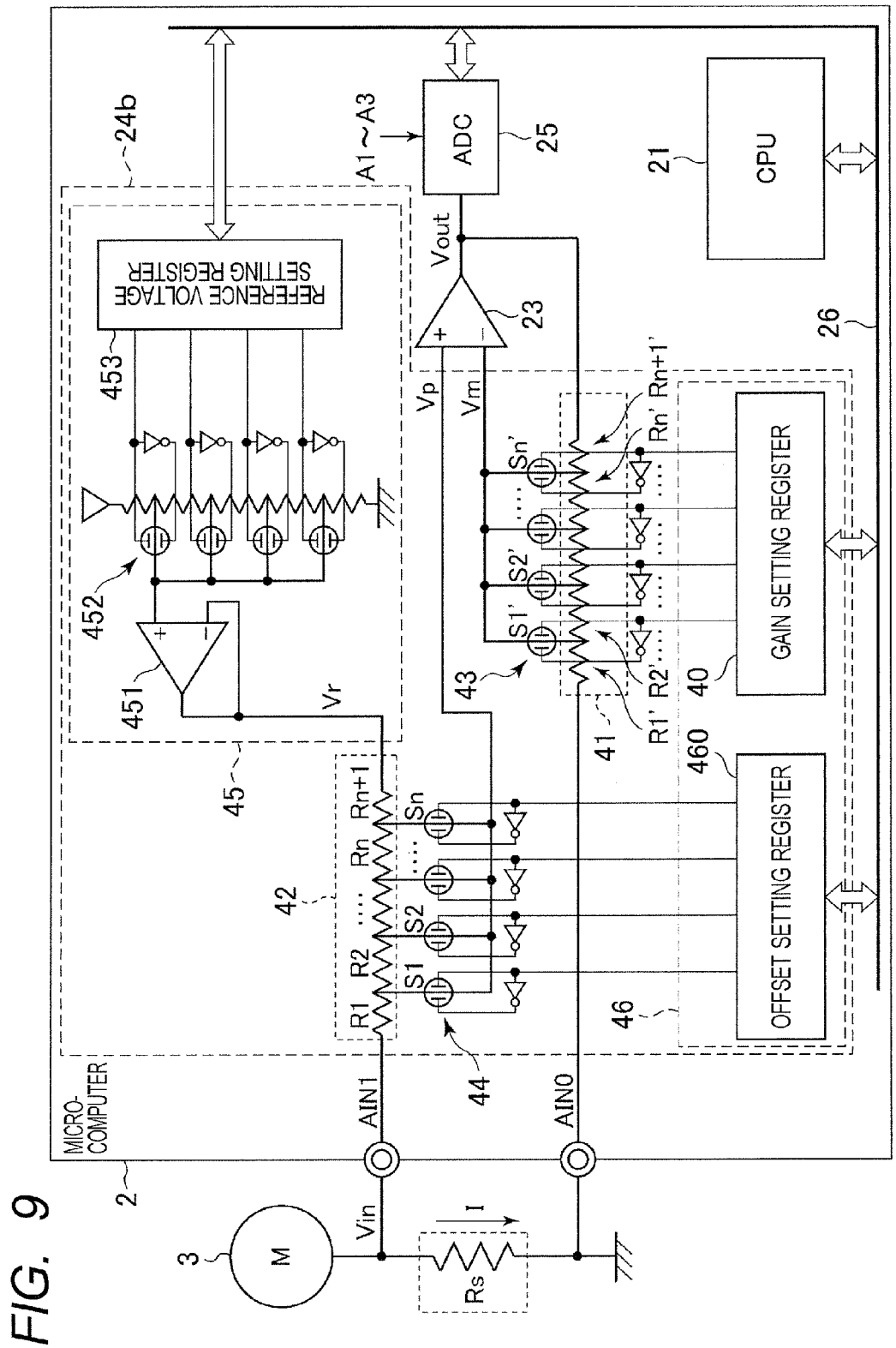
FIG. 9 is a block diagram illustrating a configuration example of a microcomputer according to a third embodiment.

A gain control circuit 24b and the operational amplifier 23 will be further described. FIG. 9 is a block diagram illustrating a configuration example of the microcomputer (semiconductor device) 2 according to this embodiment. In this figure, the timer circuit 22 is omitted from illustration. Also, the inverter circuit 4 except for the shunt resistor Rs is also omitted.

The gain control circuit 24b further includes an offset setting register 460 in addition to the configuration (the gain switching resistor group 41, the first analog switch group 43, the offset adjustment resistor group 42, the second analog switch group 44, the gain setting register 40, and the reference voltage source 45). That is, the gain control circuit 24b has the gain setting register 40 as the registers of the gain switching resistor group 41 and the first analog switch group 43. The gain control circuit 24b also has the offset setting register 460 as the resistors of the offset adjustment resistor group 42 and the second analog switch group 44. The offset setting register 460 outputs a signal corresponding to the set value, and selectively turns on one of the plural second analog switches S1, S2, . . . , Sn. The gain setting register 40 and the offset setting register 460 are called "setting register 46" in combination.

With the above configuration, the resistor $R_i'$ of the gain switching resistor group 41 and the resistor $R_i$ of the offset adjustment resistor group 42 can be set, independently, with the use of the gain setting register 40 and the offset setting register 460. In this case, the common mode rejection ratio is likely to be lowered, but there arises no problem in case where the in-phase noise is small, or in a system where the common mode rejection ratio is not emphasized. In the case where the in-phase noise is small, or in the system where the common mode rejection ratio is not emphasized, the resistor Ri' of the gain switching resistor group 41 and the resistor Ri of the offset adjustment resistor group 42 can be set, independently, to increase the degree of freedom of the gain of the programmable gain amplifier, and the offset voltage level.

Also, when the lowering of the common mode rejection ratio is problematic, the same value may be set for the gain setting register 40 and the offset setting register 460. Also, in this configuration, when the configuration of the resistor $R_i'$ of the gain switching resistor group 41 is different from the configuration of the resistor $R_i$ of the offset adjustment resistor group 42, the gain setting register 40 and the offset setting register 460 are appropriately set, respectively, so that $(R_{i+1} + \ldots + R_{n+1})/(R_1 + \ldots + R_i) = (R_{i+1}' + \ldots + R_{n+1}')/(R_1' + \ldots + R_i')$ can be satisfied, and the common mode rejection ratio can be prevented from being lowered.

The operation of the motor control system having the inverter system according to this embodiment is identical with that in the second embodiment except that the CPU 21 sets the values of the gain setting register 40 and the offset setting register 460, and sets the resistances of the gain switching resistor group 41 and the offset adjustment resistor group 42. Therefore, the repetitive description will be omitted.

Similarly in this embodiment, the same advantages as those in the second embodiment can be obtained. Also, in this embodiment, the resistance of the gain switching resistor group 41 and the resistance $R_i$ of the offset adjustment resistor group 42 can be set, independently, so that the degree of freedom of the gain of the programmable gain amplifier, and the offset voltage level can be increased. Also, the setting register 46 can be applied to the first embodiment.

Fourth Embodiment

This embodiment is different from the microcomputer 2 of the third embodiment in that the microcomputer 2 is intended for not one shunt, but three shunts. In other words, the microcomputer 2 has a programmable gain amplifier for three phases (PGA: including the gain control circuit 24b and the operational amplifier 23). The differences will be mainly described below.

Figure 10:
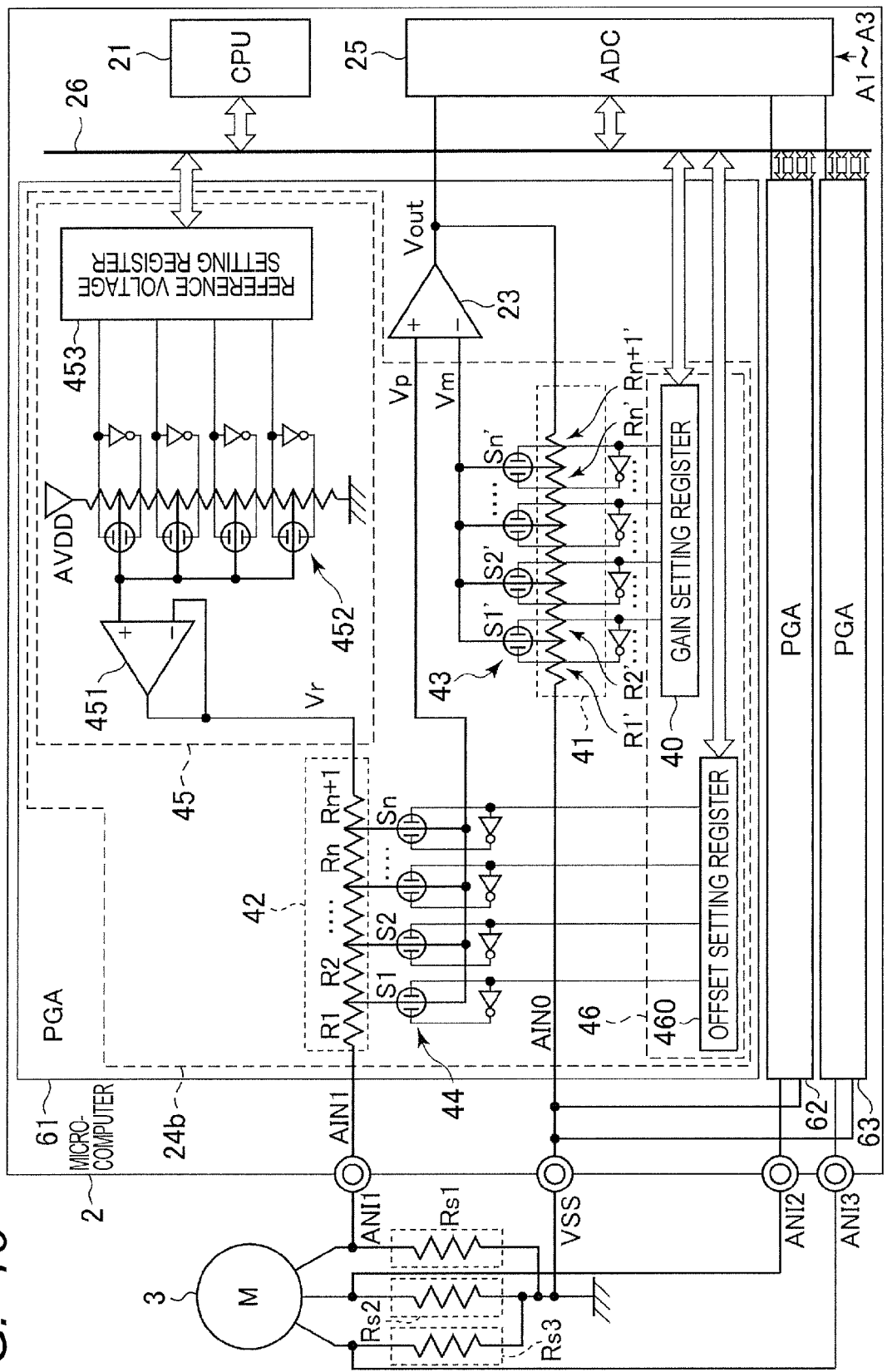
FIG. 10 is a block diagram illustrating a configuration example of a microcomputer according to a fourth embodiment.

The gain control circuit 24b and the operational amplifier 23 will be further described. FIG. 10 is a block diagram illustrating a configuration example of the microcomputer (semiconductor device) 2 according to this embodiment. In this figure, the timer circuit 22 is omitted from illustration. Also, the inverter circuit 4 except for shunt resistor Rs1 to Rs3 is omitted.

In the example of this figure, the inverter circuit 4 (FIG. 1) is an inverter circuit for three shunts, and has three shunt resistors Rs1 to Rs3. That is, the shunt resistor Rs1 is disposed in a U-phase circuit (FIG. 1: a circuit passing through the power supply E0, and the nodes n1, n3, n2) of the inverter circuit 4. The shunt resistor Rs2 is disposed in a V-phase circuit (FIG. 1: a circuit passing through the power supply E0, and the nodes n1, n4, n2) of the inverter circuit 4. The shunt resistor Rs3 is disposed in a W-phase circuit (FIG. 1: a circuit passing through the power supply E0, and the nodes n1, n5, n2) of the inverter circuit 4. The U-phase circuit, the V-phase circuit, and the W-phase circuit are connected in parallel to the power supply E0.

In the microcomputer 2, programmable gain amplifiers (PGA) 61 to 63 for three phases are provided in correspondence with the three shunt resistors Rs1 to Rs3. Each of the PGA 61 to 63 includes the gain control circuit 24b and the operational amplifier 23. The gain control circuit 24b includes the configuration (the gain switching resistor group 41, the first analog switch group 43, the offset adjustment resistor group 42, the second analog switch group 44, the reference voltage source 45, and the setting register 46) of the third embodiment. The gain control circuit may have the configuration of the first or second embodiment.

The first analog input terminal AIN0 of the PGA 61 to 63 is disposed as a common terminal VSS of the microcomputer 2. Also, the respective second analog input terminals AIN1 of the PGA 61 to 63 are disposed as a terminal ANI1, a terminal ANI2, and a terminal ANI3 of the microcomputer 2, individually. The analog input terminal ANI1 is connected to one end of the shunt resistor Rs1, the analog input terminal ANI2 is connected to one end of the shunt resistor Rs2, and the analog input terminal ANI3 is connected to one end of the shunt resistor Rs3. The other ends of the respective shunt resistors Rs1 to Rs3 are grounded to the GND, and connected to a VSS terminal of the microcomputer 2.

Each of the PGA 61 to 63 can set the gain switching resistor group 41, the offset adjustment resistor group 42, and the reference voltage source 45 for another PGA according to the shared phase, independently. In other words, the PGA 61 can set the values of the resistors in the gain switching resistor group 41 and the offset adjustment resistor group 42, and the value of the reference voltage in the reference voltage source 45, for example, in the U-phase, by the CPU 21, independently from the other PGA 62 and 63. Also, the PGA 62 can set the values of the resistors in the gain switching resistor group 41 and the offset adjustment resistor group 42, and the value of the reference voltage in the reference voltage source 45, for example, in the V-phase, by the CPU 21, independently from the other PGA 61 and 63. Further, the PGA 63 can set the values of the resistors in the gain switching resistor group 41 and the offset adjustment resistor group 42, and the value of the reference voltage in the reference voltage source 45, for example, in the W-phase, by the CPU 21, independently from the other PGA 61 and 62. Therefore, each of the PGA 61 to 63 can more appropriately amplify the voltage Vin of the shunt resistors Rs1 to Rs3 for each phase, and output the voltage Vin as the output voltage Vout.

Then, the CPU 21 executes the PWM control for each phase on the basis of the output voltage Vout that has been amplified and subjected to digital conversion. In other words, the CPU 21 conducts the PWM control for the U-phase, the V-phase, and the W-phase of the timer circuit 22 on the basis of the output voltages Vout of the PGA 61, the PGA 62, and the PGA 63, which have been converted into the digital signals by the ADC 25. The PWM control for each phase of the U-phase, the V-phase, and the W-phase by the CPU 21 may be conducted with the use of the output voltage Vout of another phase.

The operation of the motor control system having the inverter system according to this embodiment is identical with that in the third embodiment except that the CPU 21 sets the respective registers of the PGA for each phase, and sets the resistances and the reference voltage in advance or during the operation, or conducts the PWM control on the basis of the output voltage Vout obtained for each phase during the operation. Therefore, the repetitive description will be omitted.

Similarly in this embodiment, the same advantages as those in the third embodiment can be obtained.

Also, in this embodiment, the resistances of the PGA and the reference voltage are set for each phase, or controlled on the basis of the output voltage obtained for each phase during the operation. As a result, the inverter system can be controlled with high precision. Also, the first analog input terminals AIN0 of the respective PGA 61 to 63 are connected to each other within the microcomputer 2 to commonalize the VSS terminal, as a result of which the number of terminals necessary for the microcomputer 2 can be reduced without damaging the precision of the gain and the common mode rejection ratio. Also, the PGA 61 to 63 can use the programmable gain amplifier (the gain control circuit and the operational amplifier) of the first or second embodiment.

Fifth Embodiment

In this embodiment, the layout of the first resistors $R_1'$, $R_2'$, ..., $R_{n+1}'$ and the second resistors $R_1$, $R_2$, ..., $R_{n+1}$ in the microcomputer 2 is different from that in the first to fifth embodiment. The differences will be mainly described below.

Figure 11A:
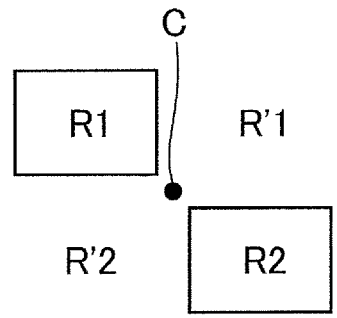
FIG. 11A is a schematic diagram illustrating one example of a layout of a first resistor and a second resistor according to a fifth embodiment.
Figure 11B:
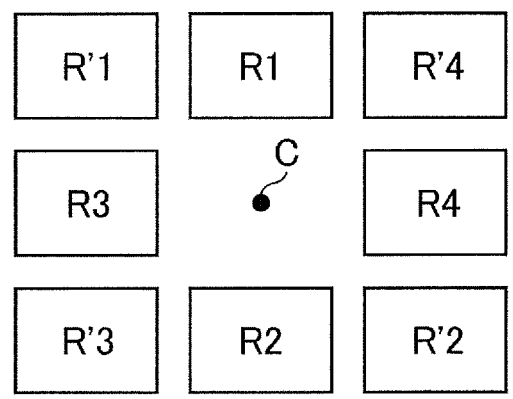
FIG. 11B is a schematic diagram illustrating another example of a layout of the first resistor and the second resistor according to the fifth embodiment.
Figure 11C:
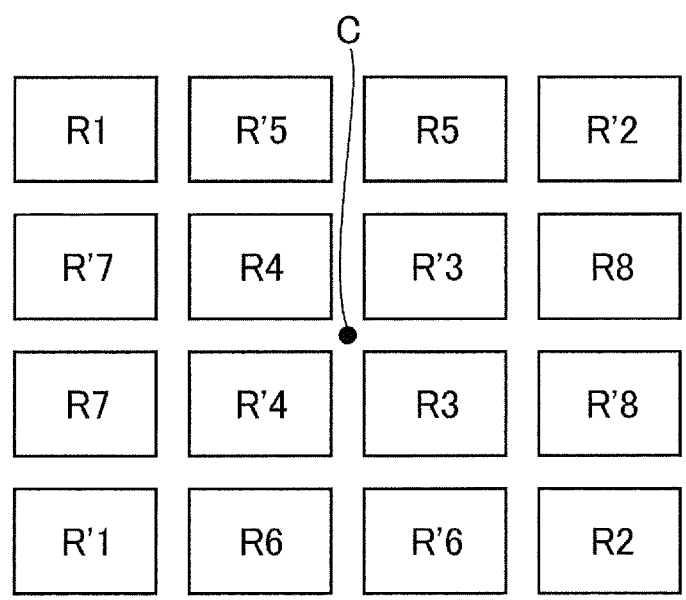
FIG. 11C is a schematic diagram illustrating still another example of a layout of the first resistor and the second resistor according to the fifth embodiment.

FIGS. 11A to 11C are schematic diagrams illustrating an example of the first resistors and the second resistors according to this embodiment. FIG. 11A illustrates a case in which the first and second resistors are arranged two by two, FIG. 11B illustrates a case in which the first and second resistors are arranged four by four, and FIG. 11C illustrates a case in which the first and second resistors are arranged eight by eight.

It is preferable that the first resistors $R_1'$, $R_2'$, ..., $R_{n+1}'$ and the second resistors $R_1$, $R_2$, ..., $R_{n+1}$ are arranged in the vicinity of each other. With this configuration, an influence of the manufacturing variation can be reduced, and $R_1'=R_1=R_2 \ldots =R_2= \ldots =R_{n+1}'=R_{n+1}$ can be satisfied. As a result, the common mode rejection ratio of the programmable gain amplifier, and the precision of the gain can be improved.

Further, it is preferable that the first resistors $R_1'$, $R_2'$, ..., $R_{n+1}'$ and the second resistors $R_1$, $R_2$, ..., $R_{n+1}$ are arranged (laid out) symmetrically with respect to the same point (or line) in the same fashion. With this layout, a relative precision of $R_1'+R_2'+ \ldots +R_i'$, $R_{i+1}'+R_{i+2}'+ \ldots +R_{n+1}'$ $R_1+R_2+ \ldots +R_i$, and $R_{i+1}+R_{i+2}+ \ldots +R_{n+1}$ can be improved without being affected by the manufacturing variation on a chip of the microcomputer 2. As a result, the common mode rejection ratio of the programmable gain amplifier, and the precision of the gain can be improved.

Specifically, for example, the respective first and second resistors will be described below.

Referring to FIG. 11A, the first resistors $R_1'$, $R_2'$, and the second resistors $R_1$, $R_2$ are arranged in the vicinity of each other. Further, the first resistor $R_1'$ and the second resistor $R_1$ are arranged in the vicinity of each other, and the first resistor $R_2'$ and the second resistor $R_2$ are arranged in the vicinity of each other. Also, the first resistors $R_1'$, $R_2'$, and the second resistors $R_1$, $R_2$ are arranged symmetrically with respect to the same point C in the same fashion (two symmetries).

Referring to FIG. 11B, the first resistors $R_1'$ to $R_4'$, and the second resistors $R_1$ to $R_4$ are arranged in the vicinity of each other. Further, the first resistor $R_1'$ and the second resistor $R_1$ are arranged in the vicinity of each other, the first resistor $R_2'$ and the second resistor $R_2$ are arranged in the vicinity of each other, the first resistor $R_3'$ and the second resistor $R_3$ are arranged in the vicinity of each other, and the first resistor $R_4'$ and the second resistor $R_4$ are arranged in the vicinity of each other. Also, the first resistors $R_1'$ to $R_4'$, and the second resistors $R_1$ to $R_4$ are arranged symmetrically with respect to the same point C in the same fashion (four symmetries).

Referring to FIG. 11C, the first resistors $R_1'$ to $R_8'$, and the second resistors $R_1$ to $R_8$ are arranged in the vicinity of each other. Further, the first resistor $R_1'$ and the second resistor $R_1$ are arranged substantially in the vicinity of each other, the first resistor $R_2'$ and the second resistor $R_2$ are arranged substantially in the vicinity of each other, and the first resistor $R_3'$ and the second resistor $R_3$ are arranged in the vicinity of each other. Further, the first resistor $R_4'$ and the second resistor $R_4$ are arranged substantially in the vicinity of each other, the first resistor $R_5'$ and the second resistor $R_5$ are arranged substantially in the vicinity of each other, the first resistor $R_6'$ and the second resistor $R_6$ are arranged in the vicinity of each other, the first resistor $R_7'$ and the second resistor $R_7$ are arranged substantially in the vicinity of each other, and the first resistor $R_8'$ and the second resistor $R_8$ are arranged in the vicinity of each other. Also, the first resistors $R_1'$ to $R_8'$, and the second resistors $R_1$ to $R_8$ are arranged symmetrically with respect to the same point C in the same fashion (two symmetries).

As described above, the layout in which the first resistors $R_1'$, $R_2'$, ..., $R_{n+1}'$ and the second resistors $R_1$, $R_2$, ..., $R_{n+1}$ in the microcomputer 2 are arranged in the vicinity of each other, or arranged symmetrically with respect to the point is applied. As a result, the common mode rejection ratio of the programmable gain amplifier, and the precision of the gain can be improved.

In this embodiment, the same advantages as those in the first to fourth embodiments can be obtained. In addition, the common mode rejection ratio of the programmable gain amplifier and the precision of the gain can be improved by the layouts exemplified in FIGS. 11A to 11C.

Figure 12:
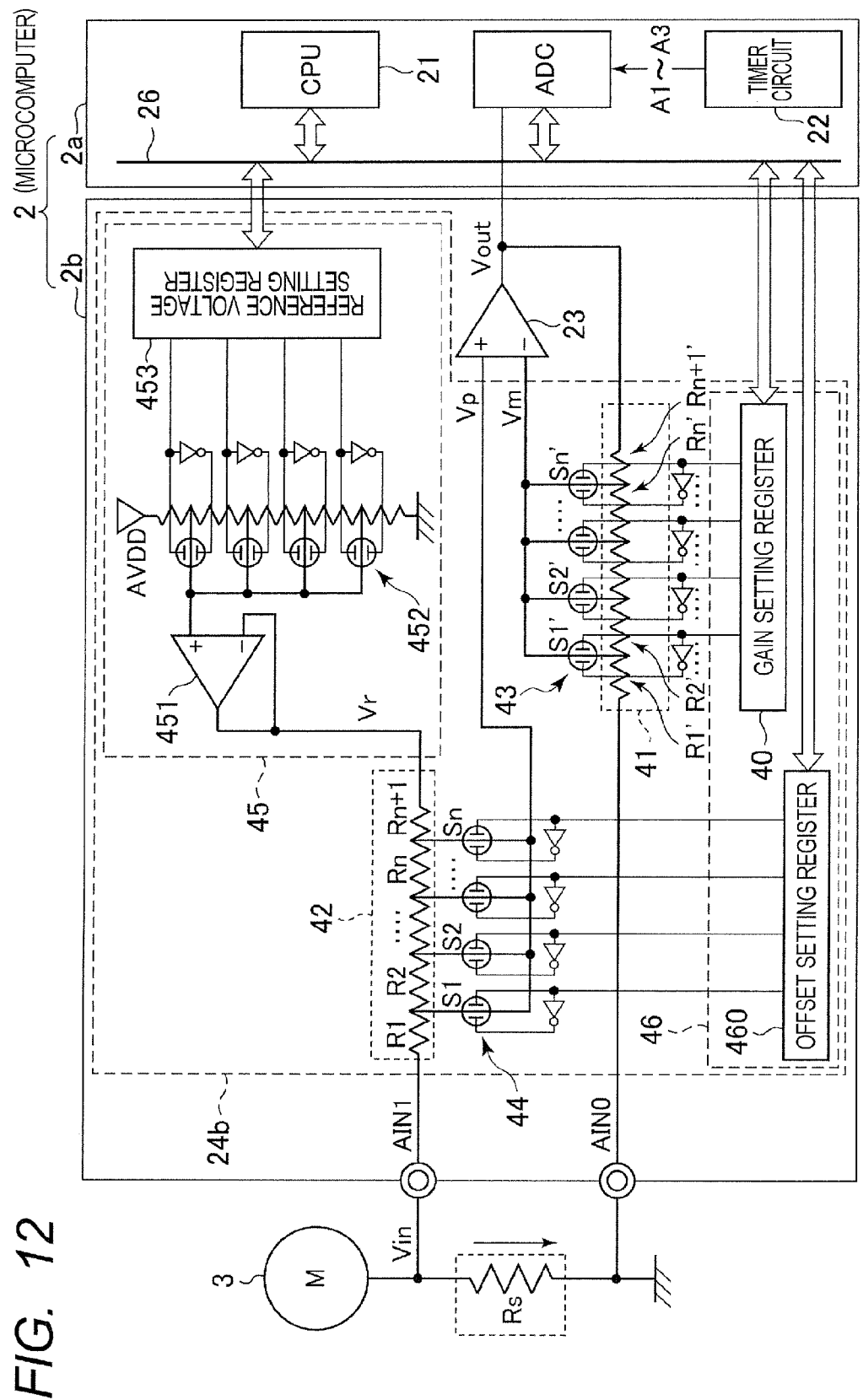
FIG. 12 is a schematic diagram illustrating a modified example of the microcomputer.

In the above first to fifth embodiments, the microcomputer 2 is configured by one chip, but may be configured by a plurality of chips. FIG. 12 illustrates an example (two chips) in which the microcomputer 2 is configured by a plurality of chips. The microcomputer 2 includes a microcomputer 2b and a microcomputer 2a. The microcomputer 2b is configured by one chip, and includes a portion (the gain control circuit and the operational amplifier) of the programmable gain amplifier. FIG. 12 illustrates an example including the gain control circuit 24b and the operational amplifier 23 in the third embodiment. The microcomputer 2a is configured by one chip, and includes the CPU 21, the ADC 25, and the timer circuit 22. The microcomputer 2b and the microcomputer 2a are connected to each other by a bus or a line so as to enable two-way communication. However, the respective embodiments are not limited to the above configurations, but the microcomputer 2 may be configured by a plurality of chips having still another configuration.

The invention made by the present inventors has been described specifically on the basis of the embodiments. However, the present invention is not limited to the above embodiments, but can be variously modified without departing from the spirit of the present invention.

What is claimed is:

1. A semiconductor device, comprising:
a gain switching resistor group having a plurality of first resistors connected in series with each other;
a first analog switch group having a plurality of first analog switches, which selects at least one of the plurality of first resistors, connected in parallel to each other;
an offset adjustment resistor group having a plurality of second resistors connected in series with each other;
a second analog switch group having a plurality of second analog switches, which selects at least one of the plurality of second resistors, connected in parallel to each other;
a setting register that selects one of the plurality of first analog switches, and one of the plurality of second analog switches to turn on the selected first and second analog switches; and
a first amplifier that is connected to the first analog switch group and the second analog switch group,
wherein the gain switching resistor group has one end connected to a first analog input terminal, and the other end connected to an output of the first amplifier,
wherein respective connection points of the plurality of first resistors are connected with respective one ends of the plurality of first analog switches, and the respective other ends of the plurality of first analog switches are connected to an inverting input terminal of the first amplifier,
wherein the offset adjustment resistor group has one end connected to a second analog input terminal, and the other end connected to a reference voltage, and
wherein respective connection points of the plurality of second resistors are connected with respective one ends of the plurality of second analog switches, and the respective other ends of the plurality of second analog switches are connected to a non-inverting input terminal of the first amplifier.

2. The semiconductor device according to claim 1,
wherein a sum of resistance values of the first resistors is equal to a sum of resistance values of the second resistors.

3. The semiconductor device according to claim 2,
wherein a sum of resistance values from a first resistor subsequent to a connection point of the selected first analog switch to a first resistor on an end of an output side of the first amplifier among the plurality of first resistors is equal to a sum of resistance values from a second resistor subsequent to a connection point of the selected second analog switch to a second resistor on an end of the reference voltage side among the plurality of second resistors.

4. The semiconductor device according to claim 3,
wherein a resistance value of an m-th (m is a natural number) resistor in the plurality of first resistors is equal to a resistance value of an m-th resistor in the plurality of second resistors.

5. The semiconductor device according to claim 1, further comprising: a reference voltage source that is connected to the other end of the offset adjustment resistor group, and changeably applies the reference voltage.

6. The semiconductor device according to claim 5,
wherein the reference voltage source includes:
a reference voltage setting register that sets a value of the reference voltage;
a digital/analog converter that converts a set value of the reference voltage setting register into an analog set value; and
a second amplifier that amplifies the set value converted into the analog.

7. The semiconductor device according to claim 6,
wherein an output impedance of the first amplifier is equal to an output impedance of the second amplifier.

8. The semiconductor device according to claim 1,
wherein the setting register includes:
a first setting register that selects one of the plurality of first analog switches to turn on the selected first analog switch; and
a second setting register that selects one of the plurality of second analog switches to turn on the selected second analog switch.

9. The semiconductor device according to claim 1,
wherein the gain switching resistor group, the first analog switch group, the offset adjustment resistor group, the second analog switch group, the setting register, and the first amplifier are disposed for each of a U-phase, a V-phase, and a W-phase.

10. The semiconductor device according to claim 1,
wherein the plurality of first resistors and the plurality of second resistors are laid out symmetrically with respect to a point.

11. The semiconductor device according to claim 1, further comprising:
an analog/digital converter that subjects an output voltage of the first amplifier to analog/digital conversion to generate an output signal; and
a control circuit that generates a drive signal for controlling a current of the inverter circuit on the basis of the output signal.

12. An inverter system, comprising:
an inverter circuit that supplies a current to a motor; and
the semiconductor device that controls a supply of the current to the motor in the inverter circuit according to claim 11,
wherein the inverter circuit includes a shunt resistor that is disposed in a current path, and
wherein the semiconductor device has a first analog input terminal and a second analog input terminal connected to the shunt resistor, and outputs a drive signal for controlling the supply of the current to the motor to the inverter circuit on the basis of a voltage across the shunt resistor.

13. A semiconductor device, comprising:
a first input terminal;
a second input terminal;
an amplifier having an inverting input terminal and a non-inverting input terminal;
a gain switching resistor group having a plurality of first resistors, the first resistors connected in series between the first input terminal and an output of the amplifier;
a first switch group having a plurality of first switches, each of the first switches coupled between a corresponding one of connection points of the first resistors and the inverting input terminal of the amplifier;

an offset adjustment resistor group having a plurality of second resistors, the second resistors coupled in series between the second input terminal and a reference voltage;

a second switch group having a plurality of second switches, each of the second switches coupled between a corresponding one of connection points of the second resistors and the non-inverting input terminal of the amplifier; and a setting register selecting one of the plurality of the first switches and one of the plurality of second switches to turn on the selected first and second switches.

14. The semiconductor device according to claim 13, wherein when an m-th (m is a natural number) first switch in the first switch group is turned on by the setting resistor, an m-th switch in the second switch group is turned on.

15. The semiconductor device according to claim 13, further comprising:

an analog-digital converter converting the output of the amplifier into an output digital signal; and a PWM generator generating at least one PWM signal based on the output digital signal.

\* \* \* \* \*